(12) United States Patent
Oki

(10) Patent No.: US 6,910,458 B2
(45) Date of Patent: Jun. 28, 2005

(54) FUEL INJECTION AMOUNT CONTROL APPARATUS FOR INTERNAL COMBUSTION ENGINE

(75) Inventor: Mamoru Oki, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/974,695

(22) Filed: Oct. 28, 2004

(65) Prior Publication Data

US 2005/0092303 A1 May 5, 2005

(30) Foreign Application Priority Data

Oct. 29, 2003 (JP) ........................................ 2003-369436
Jul. 26, 2004 (JP) ........................................ 2004-216989

(51) Int. Cl.$^7$ .............................................. F02B 77/00
(52) U.S. Cl. ................................................. 123/198 F
(58) Field of Search .......................... 123/198 F, 198 R, 123/294, 299, 300, 305, 395

(56) References Cited

U.S. PATENT DOCUMENTS 5,848,581 A * 12/1998 Hirose et al. ............... 123/357

2003/0164166 A1  9/2003  Takeuchi et al.

FOREIGN PATENT DOCUMENTS

JP          7-63104           3/1995

* cited by examiner

Primary Examiner—Bibhu Mohanty
(74) Attorney, Agent, or Firm—Nixon & Vanderhye P.C.

(57) ABSTRACT

In an injection quantity control apparatus for an internal combustion engine, a command value of an injection quantity is calculated based on a command injection quantity. After that, an injector provided for each cylinder is actuated so that a fuel injection quantity supplied into each of the cylinders is controlled in accordance with the command value. In that process, a correction amount learned in a learning control is reflected in the calculation of the command injection quantity or the command value. The learning control is performed while a cylinder cut-off control is performed when a predetermined engine operating condition is met. In the cylinder cut-off control, all of the cylinders are divided into K groups and the cylinder cut-off control is performed with the cylinders of a group in the K groups.

13 Claims, 11 Drawing Sheets

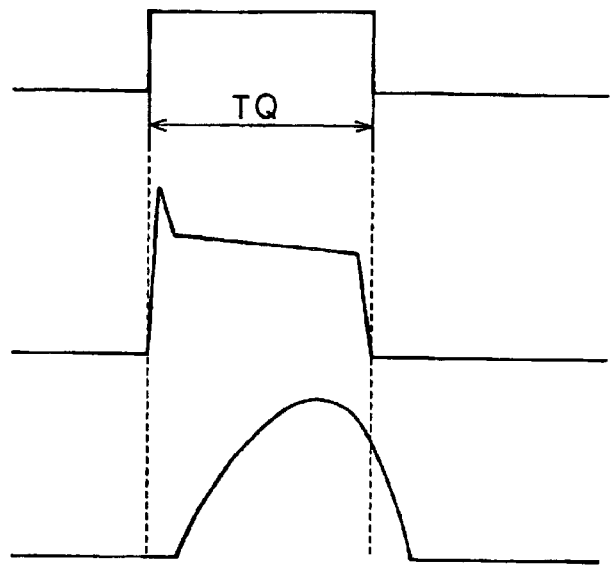
FIG. 4A
FIG. 4B
FIG. 4C
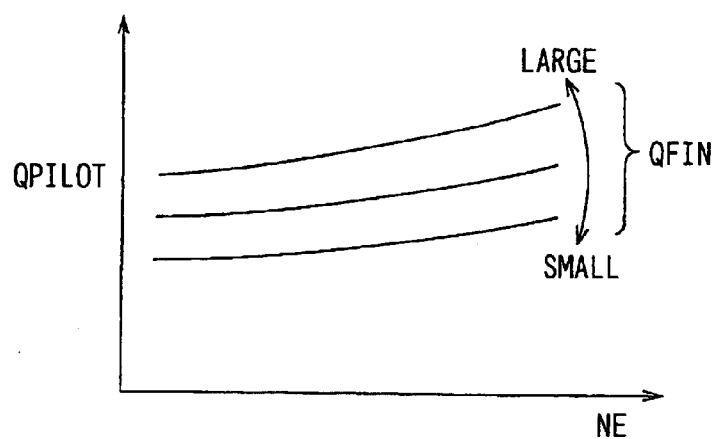
FIG. 5

FIG. 10

| PFIN | N | INT. | | | | TFIN | TARGET | BOOST PRESSURE | EGR | THROTTLE VALVE | SCV |
|---|---|---|---|---|---|---|---|---|---|---|---|
| | | QP1-2 | QP2-3 | QP3-4 | QP4-5 | | | | | | |
| A | 5 | 10 | 11 | 12 | 13 | TDC | 750 | 760 | OFF | OPEN | OPEN |
| B | 5 | ← | ← | ← | ← | TDC | ← | ← | ← | ← | ← |
| C | 5 | ← | ← | ← | ← | TDC | ← | ← | ← | ← | ← |
| D | 5 | ← | ← | ← | ← | TDC | ← | ← | ← | ← | ← |
| E | 5 | ← | ← | ← | ← | TDC | | | | | ← |

|   | #1 | #3 | #4 | #2 |
|---|---|---|---|---|
| A MPa |   |   |   |   |
| B MPa |   |   |   |   |
| C MPa |   |   |   |   |
| D MPa |   |   |   |   |
| E MPa |   |   |   |   |

FUEL INJECTION AMOUNT CONTROL APPARATUS FOR INTERNAL COMBUSTION ENGINE

CROSS REFERENCE TO RELATED APPLICATION

This application is based on Japanese Patent Application Nos. 2003-369436 filed on Oct. 29, 2003, and 2004-216989 filed on Jul. 26, 2004, the disclosures of which are incorporated herein by reference.

FIELD OF THE INVENTION

The present invention relates to a fuel injection quantity control apparatus for an internal combustion engine, wherein a correction amount to correct a command injection quantity in accordance with an operating condition of the engine, or a command value of an injection quantity in accordance with the command injection quantity and a fuel injection pressure, is learned. The learned correction amount is used to correct the command injection quantity of the command value of the injection.

BACKGROUND OF THE INVENTION

Conventionally, a common rail type fuel injection system (hereinafter referred to as "common rail system") has been proposed, wherein high-pressure fuel accumulated in the common rail is injected into each cylinder in a multi-cylinder diesel engine. The common rail system performs a pilot injection control, wherein a small amount of fuel is injected several times prior to a main injection, which mainly makes torque of the engine, to stabilize combustion from the beginning of the main injection. To inject the small amount of fuel several times, an electromagnet valve of an injector is actuated several times during one combustion stroke of the engine. The pilot injection control is aimed at reducing engine vibrations and combustion noise, and improving emission from the engine.

Additionally, a technique, which strikes a balance between the pilot injection control and an injection quantity correction control for an engine speed variation between the cylinders (non-uniformity amount correction: FCCB correction), has been proposed. Furthermore, a technique, which strikes a balance among the pilot injection control, a correction in an idling speed control (ISC correction) and other correction controls, has been also proposed (for example, JP-A-7-063104).

In general, the common rail system calculates a command injection quantity adding a correction amount of an injection quantity considering engine coolant temperature, fuel temperature and so on, to a basic injection quantity, which is calculated in accordance with an engine speed and an acceleration stroke. After that, the system calculates a current supply period (command value of injection quantity) of a pulsed injector driving signal (TQ pulse) in accordance with the command injection quantity and a fuel injection pressure (common rail pressure) detected by, for example, a fuel pressure sensor.

The common rail system controls a fuel injection quantity supplying into each cylinder of the engine actuating the electromagnetic valve of each injector based on the command value of the injection quantity. Thus, the command value of the injection quantity supplied to the electromagnetic valve of the injector comes to control the fuel injection quantity in the common rail system, and usually, a relationship between the command value of the injection quantity (command injection pulse period) and an actual fuel injection quantity is assured with respect to each of the injectors.

However, the fuel injection amount assured with respect to each of the injectors has an error and the error becomes larger after a performance (function) degradation of the injector due to, for example, a secular change (secular change degradation of injector) has been occurred. Although the error of the injection quantity to the command value of the injection quantity is assured adjusting the injectors individually, the pilot injection quantity may become too small or even zero due to the error when the correction amount ($\Delta Q$) by the conventional FCCB correction control is a negative value because the pilot injection quantity is as small as or less than 5 $mm^3$/st. on the contrary, the pilot injection quantity may become too large when the correction amount ($\Delta Q$) by the conventional FCCB correction control is a positive value.

In such a case, the purpose of the pilot injection control cannot be achieved enough. Especially, under a high injection pressure, the error of the injection quantity to the command value of injection quantity tends to become larger so that assuring the performance of each of the injectors is difficult in a very small injection quantity such as 1 $mm^3$/st.

To overcome such problems, a learning control system for the pilot injection quantity has been proposed. The system learns the error of the injection quantity to the current supply period of the TQ pulse in the pilot injection control using the conventional FCCB correction or the idle speed correction (ISC correction) as described in the JP-A-07-063104. However, because the condition for learning the correction amount is limited to an injection condition (for example, an injection pressure of fuel) in a stable idling operation, the learned correction amount cannot be accurately. reflected under other fuel injection pressures mainly used during the vehicle is running or under a high injection pressure. Additionally, in a case where the system described in the JP-A-07-063104 is applied to an eight-cylinder engine, the relationship between the error and the variation is low in the eight-cylinder engine because the error of the injection quantity between cylinders and the variation of the rotation speed between cylinders hardly appear. Therefore,it is unable to precisely learn the pilot injection quantity between cylinders in such a multi-cylinder engine.

SUMMARY OF THE INVENTION

The present invention is made in view of the foregoing matter and it is an object of the present invention to provide a fuel injection quantity control apparatus for an internal combustion engine capable of performing the learning control precisely even in a multi-cylinder engine having more than five cylinders. Another object of the present invention is to provide a fuel injection quantity control apparatus for an internal combustion engine capable of correcting the command injection quantity or the command value of the injection quantity based on the correction amount, which is calculated with respect to each pressure level, over the wide-range operation area used in usual engine operating condition when a predetermined engine operating condition is satisfied.

According to the present invention described in claim 1, when a predetermined engine operating condition is met, for example, when one of an idling stable condition, a learning control precondition, and a learning control performing condition is met, the learning control performing means performs the learning control while a cylinder cut-off control with the cylinders of a group is performed, in which all of the cylinders are uniformly or approximately uniformly divided into K groups and the group is the one of the K groups.

Accordingly, all of the cylinders are divided into a cylinder group of performing fuel injections and a cylinder group of halting fuel injections, and then, the learning control for learning a correction amount for each of the cylinders to smooth the engine speed variation between the cylinders is performed to only the cylinder group of performing fuel injection. Thus, it is capable of thinning not only fuel injections, but also detection (calculation) timing of the engine speed variation for each of the cylinders and the average engine speed variation between the cylinders. Accordingly, the relationship between the injection amount variation between cylinders and the engine speed variation between cylinders becomes high because the injection amount variation between cylinders and the engine speed variation between cylinders largely appears. Therefore, it is capable of precisely performing the learning control for the correction amount to the command value of the injection quantity, which is calculated corresponding to the command injection quantity, even in a multi-cylinder engine having more than five cylinders.

According to the present invention described in claim 2, all of the cylinders are uniformly or approximately uniformly divided into the K groups on the basis of the number of the cylinders of the engine, an order of injection or a cylinder arrangement. For example, in a V-8 engine, the cylinders may be divided into two groups so that the cylinder arrangement of the cylinder groups is symmetrical. Furthermore, the cylinders may be divided into two groups so that the fuel is supplied to every other cylinder in the injection order.

According to the present invention described in claim 3, when a predetermined engine operating condition is met, for example, when one of an idling stable condition, a learning control precondition, and a learning control performing condition is met, the learning control performing means performs the learning control for learning a correction amount for each of the cylinders to smooth the engine speed variation between the cylinders while the cylinder cut-off control and the fuel injection control are performed. The cylinder cut-off control is performed with respect to each cylinder group, in which all of the cylinders are uniformly or approximately uniformly divided into K groups and the group is the one of the K groups. The fuel injection control is performed with the command injection quantity under each pressure level.

Accordingly, it is possible to correct the command injection quantity or the command values of the injection quantity based on the correction amount for each of the cylinders with respect to each pressure level over the wide-range operation area, in which the engine is running normally.

According to the present invention described in claim 4, when a predetermined engine operating condition is met, for example, when one of an idling stable condition, a learning control precondition, and a learning control performing condition is met, the learning control performing means performs a first learning control for learning a first correction amount for each of the cylinders to smooth the engine speed variation, and a second learning control for learning a second correction amount evenly for all of the cylinders to maintain the engine speed at a target engine speed while a fuel injection control with the command injection quantity is performed.

Accordingly, all of the cylinders are divided into a cylinder group of performing fuel injections and a cylinder group of halting fuel injections, and then, the first learning control for learning the first correction amount for each of the cylinders to smooth the engine speed variation between the cylinders, and the second learning control for learning the second correction amount evenly for all of the cylinders to maintain the engine speed at the target engine speed is performed to only the cylinder group of performing fuel injection. Thus, it is capable of thinning not only fuel injections, but also detection (calculation) timing of the engine speed variation for each of the cylinders and the average engine speed variation between the cylinders. Therefore, it is capable of correcting the command injection quantity or the command value of the injection quantity based on the first correction amount and the second correction amount. Additionally, it is possible to quantitatively grasp the injection quantity variation amount to each of the command values of the injection quantity, the injection quantity variation amount between the cylinders, the individual difference of the injector, or the deterioration amount for the injector due to secular change with respect to each of the cylinders while performing the fuel injection control with the command injection quantity.

According to the present invention described in claim 5, when a predetermined engine operating condition is met, for example, when one of an idling stable condition, a learning control precondition, and a learning control performing condition is met, the learning control performing means performs a first learning control for learning a first correction amount for each of the cylinders to smooth the engine speed variation, and a second learning control for learning a second correction amount evenly for all of the cylinders to maintain the engine speed at a target engine speed while a fuel injection control with the command injection quantity is performed with respect to each pressure level.

Accordingly, it is possible to correct the command injection quantity or the command values of the injection quantity based on the first and the second correction amount for each of the cylinders with respect to each pressure level over the wide-range operation area, in which the engine is running normally.

Additionally, the first learning control for learning the first injection quantity correction amount for each of the cylinders with respect to each of the pressure levels not limited to a fuel injection pressure in the stable idling condition, and the second learning control for learning the second injection quantity correction amount evenly for all of the cylinders with respect to each of the pressure levels not limited to a fuel injection pressure in the stable idling condition, to maintain the idling speed at the target engine speed, are performed.

Accordingly, it is possible to quantitatively grasp the injection quantity variation amount to each of the command values of the injection quantity, the injection quantity variation amount between the cylinders, the individual difference of the injector, or the deterioration amount for the injector due to secular change with respect to each of the cylinders over the wide-range operation area, in which the engine is running normally.

Furthermore, when a predetermined engine operating condition is met, for example, when one of an idling stable condition, a learning control precondition, and a learning control performing condition is met, the learning control performing means performs a first learning control for learning a first correction amount for each of the cylinders to smooth the engine speed variation between the cylinders, and a second learning control for learning a second correction amount evenly for all of the cylinders to maintain the engine speed at a target engine speed while a cylinder cut-off control is performed. The cylinder cut-off control is performed with respect to each cylinder group, in which all of the cylinders are uniformly or approximately uniformly divided into K groups and the group is the one of the K groups.

Accordingly, all of the cylinders are divided into a cylinder group of performing fuel injections and a cylinder group of halting fuel injections, and then, the first learning control for learning the first correction amount for each of the cylinders to smooth the engine speed variation between the cylinders, and the second learning control for learning the second correction amount evenly for all of the cylinders to maintain the engine speed at the target engine speed is performed to only the cylinder group of performing fuel injection.

Thus, it is capable of thinning not only fuel injections, but also detection (calculation) timing of the engine speed variation for each of the cylinders and the average engine speed variation between the cylinders. Accordingly, the relationship between the injection amount variation between cylinders and the engine speed variation between cylinders becomes high because the injection amount variation between cylinders and the engine speed variation between cylinders largely appears. Therefore, it is capable of precisely performing the learning control for learning the first and the second correction amount to the command value of the injection quantity, which is calculated corresponding to the command injection quantity, even in a multi-cylinder engine having more than five cylinders.

According to the present invention described in claim 6, all of the cylinders are uniformly or approximately uniformly divided into the K groups on the basis of the number of the cylinders of the engine, an order of injection or a cylinder arrangement. For example, in a V-8 engine, the cylinders may be divided into two groups so that the cylinder arrangement of the cylinder groups is symmetrical. Furthermore, the cylinders may be divided into two groups so that the fuel is supplied. to every other cylinder in the injection order.

According to the present invention described in claim 7, when the first correction amount or the second correction amount is not stabilized after a predetermined period has elapsed, the engine speed variation between the cylinders is not smoothed after a predetermined period has elapsed, the engine speed does not approximately correspond to the target engine speed after a predetermined period has elapsed, or the first correction amount or the second correction amount is equal to or more than a predetermined value, the learning control performing means suspends or stops performing the first or the second learning control, or re-learns the first correction amount or the second correction amount. Therefore, it is capable of preventing an incorrect learning or an excessive learning of the first and the second correction amount.

According to the present invention described in claim 8, when an engine operating condition is in unstable condition, for example, when the engine speed variation between cylinders is equal to or more than a predetermined value during the first learning control is performed, the engine speed is equal or more than a predetermined value during the second learning control is performed, the variation of the first or the second correction amount is equal or more than a predetermined value, or the variation of the fuel injection pressure is equal or more than a predetermined value, the learning control performing means suspends or stops performing the first or the second learning control, or re-learns the first correction amount or the second correction amount. Therefore, it is capable of preventing an incorrect learning or an excessive learning of the first and the second correction amount.

According to the present invention described in claim 9, when a predetermined engine operating condition is met, for example, when one of an idling stable condition, a learning control precondition, and a learning control performing condition is met, the learning control performing means performs a first learning control for learning a first correction amount for each of the cylinders to smooth the engine speed variation, and a second learning control for learning a second correction amount evenly for all of the cylinders to maintain the engine speed at a target engine speed while a multiple-injection control with a small injection quantity corresponding to a value with 1/N of a total injection quantity uniformly divided the command injection quantity by the number of the multiple injection is performed with respect to each pressure level.

Accordingly, it is possible to correct the command injection quantity or the command values of the injection quantity based on the first and the second correction amount for each of the cylinders with respect to each pressure level over the wide-range operation area, in which the engine is running normally.

Additionally, the first learning control for learning the first injection quantity correction amount for each of the cylinders with respect to each of the pressure levels not limited to a fuel injection pressure in the stable idling condition, and the second learning control for learning the second injection quantity correction amount evenly for all of the cylinders with respect to each of the pressure levels not limited to a fuel injection pressure in the stable idling condition, to maintain the idling speed at the target engine speed, are performed.

Accordingly, it is possible to quantitatively grasp the injection quantity variation amount to each of the command values of the injection quantity, the injection quantity variation amount between the cylinders, the individual difference of the injector, or the deterioration amount for the injector due to secular change with respect to each of the cylinders even in a case where 1) the injection pressure is high, in which it is difficult to assure the quality of the injector, and the injection quantity is small, 2) the injection pressure is low and the injection quantity is small, or 3) the injection pressure is middle and the injection quantity is small.

Furthermore, when a predetermined engine operating condition is met, for example, when one of an idling stable condition, a learning control precondition, and a learning control performing condition is met, the learning control performing means performs a first learning control for learning a first correction amount for each of the cylinders to smooth the engine speed variation between the cylinders, and a second learning control for learning a second correction amount evenly for all of the cylinders to maintain the engine speed at a target engine speed while a cylinder cut-off control is performed. The cylinder cut-off control is performed with respect to each cylinder group, in which all of the cylinders are uniformly or approximately uniformly divided into K groups and the group is the one of the K groups.

Accordingly, the relationship between the injection amount variation between cylinders and the engine speed variation between cylinders becomes high because the injection amount variation between cylinders and the engine speed variation between cylinders largely appears. Therefore, it is capable of precisely performing the learning control for learning the first and the second correction amount to a small injection quantity such as a pilot injection quantity, or the command value of the injection quantity corresponding to the small injection quantity in a multi-cylinder engine having more than five cylinders.

According to the present invention described in claim 10, the first correction amount and the second correction amount is an injection quantity correction amount to the small injection quantity per one injection in the multiple injection control or an injection period correction amount to the command value of the injection quantity per one injection in the multiple-injection control for each of the cylinders with respect to each of the pressure levels.

Therefore, it is capable of minimizing the error amount of the injection quantity to, for example, the small injection quantity, which is calculated in accordance with the engine operating condition, or the command value of the injection quantity, which is calculated in accordance with the small injection quantity and the fuel injection pressure. Therefore, the ideal relationship between the small injection quantity or the command value of the injection quantity and the actual fuel injection quantity can be established.

According to the present invention described in claim 11, a value added a first value with 1/N ("N" is the number of the multiple injection) of the first correction amount, a second value with 1/N of the second correction amount, and a previous learned value with respect to each of the pressure levels is updated and stored as a present learned value for each of the cylinders with respect to each of the pressure levels. Therefore, the ideal relationship between the command value of the injection quantity and the actual fuel injection quantity, which is actually injected into each of the cylinders, can be established.

Accordingly, it is capable of correcting the command injection quantity, which is calculated in accordance with the engine operating condition, or the command values of the injection quantity, which is calculated in accordance with the command injection quantity and the fuel injection pressure, based on the learned value with respect to each pressure level over the wide-range operation area, in which the engine is running normally.

According to the present invention described in claim 12, when a variation of the previous learned value and the present learned value is equal to or more than a predetermined value or an accumulated learned value accumulated all learned values calculated by the first and second learning control so far is equal to or more than a predetermined value, the present learned value is invalidated. Therefore, it is capable of preventing the present learned value from an incorrect learning or an excessive learning.

Additionally, as in claim 13, the multiple injection may be an N split injection performing a pilot injection once or,more than once prior to a main injection, an N split injection performing an after injection once or more than once after the main injection, or an N split injection performing a pilot injection once or more than once prior to a main injection and an after injection once or more than once after the main injection.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIG. 4A is a time chart representing a current supply period of a TQ pulse;

FIG. 4B is a time chart representing the wave form of the injector driving current;

FIG. 4C is a time chart representing the fuel injection rate;

FIG. 5 is a characteristic diagram for calculating the pilot injection quantity;

FIG. 10 is a diagram of assistance in explanation of the injection pattern in the uniform split injection control;

DETAILED DESCRIPTION OF EMBODIMENT

An embodiment of the present invention will be described hereinafter with reference to the drawings.

Figure 1:
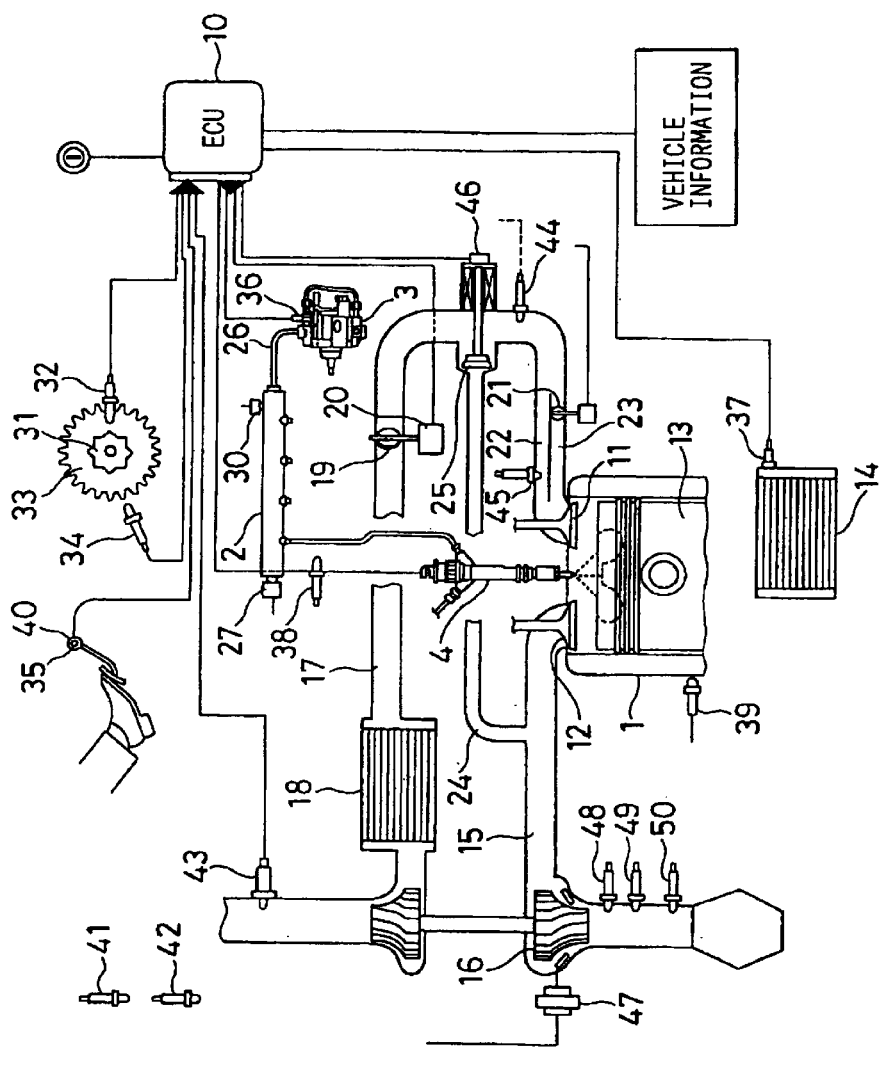
FIG. 1 is a schematic view of a common rail type fuel injection system.

FIGS. 1 to 17 are views of assistance in explaining an embodiment according to the present invention. FIG. 1 shows a common rail type fuel injection system (hereinafter referred to as "common rail system").

The common rail system in this embodiment includes a multi-cylinder engine 1 (for example, a V-8 diesel engine, hereinafter referred to as "V-8 engine" or "engine"), a common rail 2, a supply pump 3, a plurality of injectors 4 and an engine control unit (ECU) 10. As an accumulator, the common rail 2 accumulates a high-pressure fuel, wherein the pressure of the fuel in the common rail 2 corresponds to an injection pressure of the fuel, which is supplied into a combustion chamber of each cylinder. As a pump for supplying fuel, the supply pump 3 supplies the fuel into the common rail 2 with pressurizing the sucked fuel. The injector 4 is provided with respect to each of the cylinders of the V-8 engine. The ECU 10 electrically controls the supply pump 3 and the injectors 4.

An intake valve opens and closes an intake port of each of the cylinders in the V-8 engine 1. Similarly, an exhaust valve opens and closes an exhaust port of each of the cylinders. A piston is fitted for axial sliding motion in each of the cylinders and is connected to a crankshaft (not shown) by a connecting rod. A radiator 14 is disposed in an engine room (not shown) at a position where the radiator 14 is exposed to opposed wind. The radiator 14 is provided with a coolant temperature sensor 37, which detects the temperature of the coolant for cooling the engine 1.

The exhaust gas discharged from the cylinders flows through an exhaust pipe 15, drives a turbine wheel of a variable-geometry turbocharger (VGT) 16 and is discharged through a catalyst and a muffler (none shown) during the V-8 engine 1 is in operation. The VGT 16 is controlled on the basis of signals provided by an intake pressure sensor, a boost pressure sensor 44 and a VGT position sensor 47. Compressed, high-temperature intake air is sucked into the cylinders through the intake ports of the engine 1 after being cooled by an intercooler 18.

A throttle valve 19 is placed in an intake pipe 17. The throttle valve 19 adjusts a flow amount of intake air flowing through the intake pipe 17 into the engine 1. An actuator 20 controlled by a control signal output from the ECU 10 adjusts an opening of the throttle valve 19. A throttle position sensor (not shown) for detecting the opening of the throttle valve 19 is provided in the actuator 20. The throttle position sensor may detects the positions that the throttle valve is fully closed such as in an idle operating condition and substantially fully open position such as in a high-load operation, respectively, and may output the signals to the ECU 10.

A swirl control valve 21 (SCV), which is operated in response to a signal provided by the ECU 10 is placed in the vicinity of the intake port of the intake pipe 17. The SCV 21 is placed in a bypass passage 23 bypassing an intake passage 22 provided with an intake temperature sensor 45. The SCV 21 is not energized at a low-load condition to close the passage 23 and is energized at a high-load condition to open the passage 23.

An exhaust gas recirculation pipe 24 is connected to the intake pipe 17 to recirculate part of the exhaust gas flowing through the exhaust pipe 15 into the intake pipe 17 in an exhaust gas recirculation (EGR) control. A valve 25 (EGR valve) for the EGR control is placed at the joint portion of the intake pipe 17 and the exhaust gas recirculation pipe 24. The exhaust gas flowing trough the exhaust pipe 15 into the intake pipe 17 is mixed with the intake air and the mixed gas is sucked into the cylinders to reduce production of nitrogen oxides ($NO_x$). The position of the EGR valve 25 is controlled so that the EGR amount corresponds to a predetermined amount, which is set with respect to each operating condition of the V-8 engine 1. The EGR amount is controlled to maintain at a predetermined amount with a feedback control using signals from an intake air flow sensor 43, the intake temperature sensor 45, an exhaust 02 sensor 48 and an EGR valve position sensor 46.

The high-pressure fuel pressurized to the fuel injection pressure is required to be accumulated in the common rail 2 continuously. The fuel supply pump 3 supplies high-pressure fuel through a pressure pipe 26 into the common rail 2 to accumulate the high-pressure fuel in the common rail 2. A pressure limiter 27 for releasing pressure to prevent the fuel injection pressure from rise beyond a predetermined limit pressure is placed in a relief pipe (not shown), which returns fuel from the common rail 2 to a fuel tank in a predetermined condition. The pressure of the fuel accumulated in the common rail 2 (common rail pressure) corresponding to the fuel injection pressure is detected by an injection pressure detecting means, e.g. a common rail pressure sensor 30.

The fuel supply pump 3 is a high-pressure pump including a feed pump (not shown) for pumping the fuel from the fuel tank (not shown), and a solenoid valve such as an adjusting valve for adjusting a discharge amount of the high-pressure fuel into the common rail 2. A fuel temperature sensor 36 for detecting a temperature of the fuel sucked from the fuel tank is provided in the fuel supply pump 3.

A injector 4 is provided to each of the cylinders (#1–#8) in the cylinder block of the V-8 engine 1. Each of the injectors 4 is an electromagnetic type fuel injection valve including an injection nozzle, through which the high-pressure fuel is injected into the corresponding cylinder, an actuator such as a solenoid valve for actuating the nozzle needle in the fuel injection nozzle. toward an opening direction, and a spring for urging the nozzle needle toward a closing direction.

Each of the injector 4 injects the high-pressure fuel accumulated in the common rail 2 into the corresponding, for example, while the solenoid valve is open. The fuel leaked from the injectors 4 and discharged from a back pressure control chamber for controlling the back pressure applied to the nozzle needle (return fuel) is returned into the fuel tank through a fuel return passage. In addition, as the opening period (fuel injection period) of the solenoid valve of each of the injectors 4 is longer, the fuel injection quantity injected into each of the cylinders becomes larger.

The ECU 10 is provided with a microcomputer of a conventional architecture including a CPU for carrying out control processes and calculation processes, a storage device (memory such as a ROM, a standby RAM, an EEPROM, a RAM and so on) for storing programs and data, an input circuit, an output circuit, a power circuit, an injector driving circuit, a pump driving circuit and so on. A voltage signal output from the common rail pressure sensor 30 and other sensor signals output from other types of sensors are input into the microcomputer in the ECU 10 after an A/D converter converts the analog signals into digital signals. When the ignition key is returned to an IG position with an ignition switch (not shown) on after cranking the engine 1, the ECU 10 electronically controls the actuators for operating the components including the fuel supply pump 3 and the injectors 4 based on the programs stored in the memory.

A cylinder identifying means includes a signal rotor 31 rotating corresponding to a camshaft of the V-8 engine 1, capable of rotating once while the crankshaft of the engine 1 rotates twice, a cylinder tooth (projected portion) formed on a peripheral portion of the rotor 31 corresponding to each of the cylinders, and a cylinder identifying sensor. (electromagnetic pick-up sensor) 32 generating a cylinder identifying signal pulse G, which is generated by approach and estrangement of those cylinder teeth.

An engine speed detecting device includes a signal rotor 33 rotating corresponding to the crankshaft of the engine 1 (for example, a rotation body rotating once while the crankshaft rotates once), a large number of teeth (projected portions) for detecting a crank angle formed on a peripheral portion of the signal rotor 33, and a crank angle sensor (electromagnetic pick-up sensor) 34 for generating an NE signal pulse every time one of the teeth for detecting a crank angle passes before the crank angle sensor 34. The crank angle sensor 34 provides a plurality of the NE signal pulses while the signal rotor 33 rotates once, namely, the crankshaft rotates once. A specific NE signal pulse corresponds to the top dead center (TDC) of the piston of each of the cylinders (cylinders #1 to #8). The ECU 10 measures intervals between the NE pulses to detect engine speed NE.

The ECU 10 includes a discharge amount control unit, which calculates an optimum fuel injection pressure (optimum common rail pressure) corresponding to the operating condition of the V-8 engine 1 and drives the solenoid valve of the fuel supply pump 3 through a pump driving circuit. The ECU 10 calculates a target fuel pressure PFIN on the basis of the engine speed NE and the command injection quantity, and controls the discharge amount of fuel discharged from the fuel supply pump 3 adjusting a pump-driving signal (driving current) for driving the solenoid valve of the fuel supply pump 3 to achieve the target fuel pressure PFIN.

More preferably, to improve the accuracy of the fuel injection quantity control, the ECU 10 may control the pump driving signal for driving the solenoid valve of the fuel supply pump 3 using a feedback control so that the fuel pressure in the common rail 2 (common rail pressure NPC) detected by the common rail pressure sensor 30 corresponds to the target fuel pressure PFIN, which is set corresponding to the operating condition of the engine 1.

The ECU 10 also performs as an injection quantity controller, which controls the fuel injection quantity to be injected into each of the cylinders. Additionally, the ECU 10 includes a injection timing determining device, a basic injection quantity determining device, a command injection quantity determining device, an injection period determining device and an injector driving device.

The injection timing determining device calculates an optimum command injection timing TFIN (injection timing) in accordance with the engine speed NE, the acceleration stroke ACCP and a characteristic map (not shown). The characteristic map is made in advance using experimental data.

Figure 2:
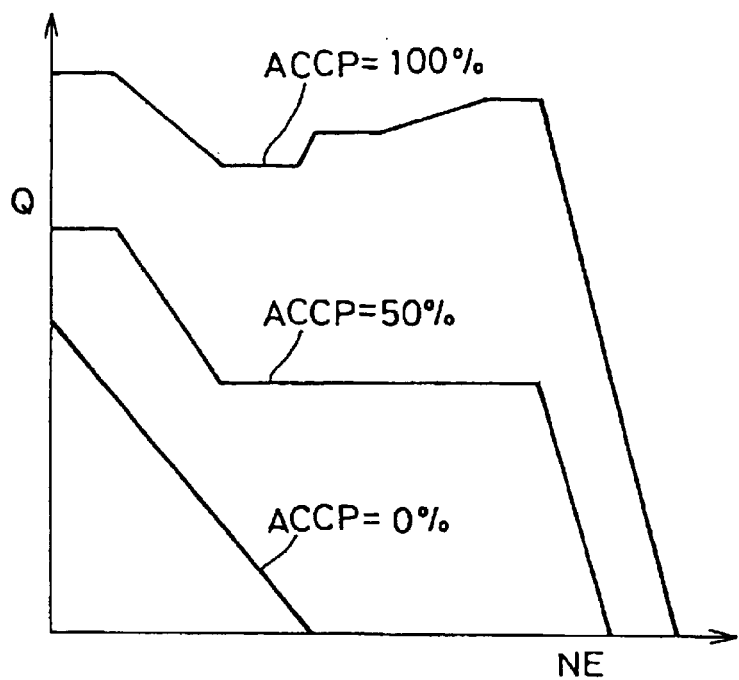
FIG. 2 is a characteristic diagram for calculating a base injection quantity.
Figure 3:
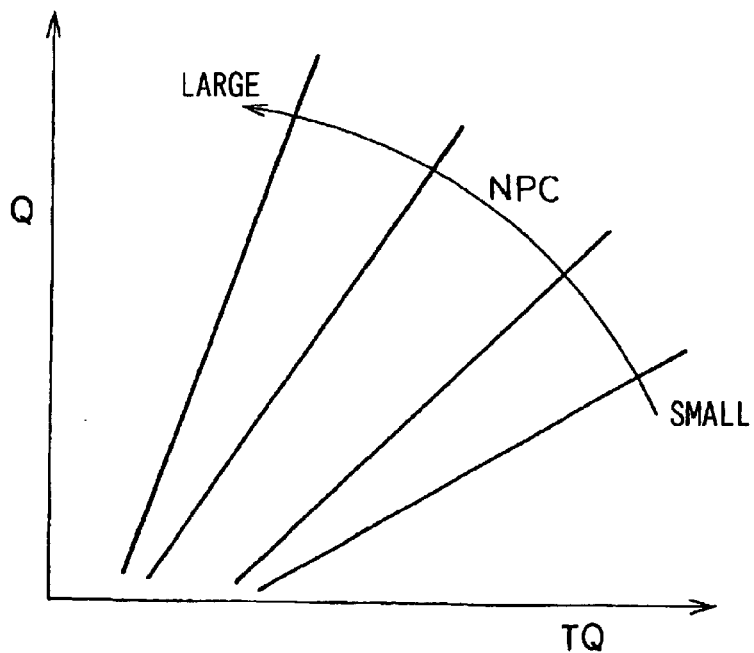
FIG. 3 is a characteristic diagram for calculating an injection command pulse period TQ.
Figure 6:
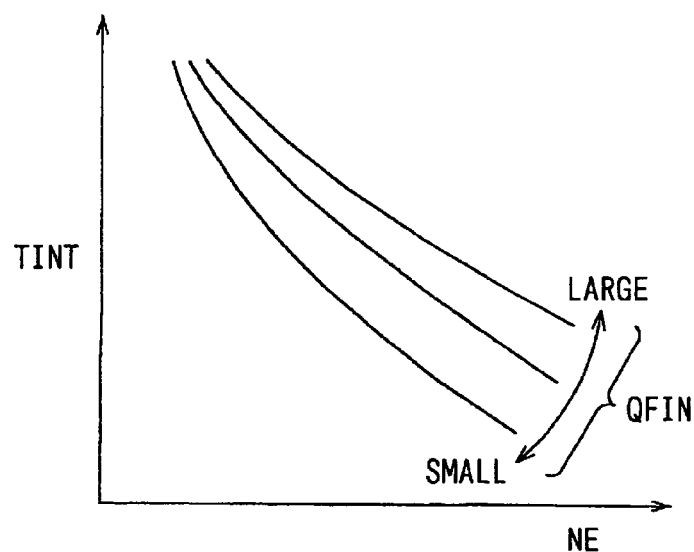
FIG. 6 is a characteristic diagram for calculating the pilot interval.

The basic injection quantity determining device calculates an optimum basic injection quantity Q in accordance with the engine speed NE, the acceleration stroke ACCP and a characteristic map (shown in FIG. 2). The characteristic map is made in advance using experimental data.

The command injection quantity determining device calculates a command injection quantity QFIN adding an injection quantity correction amount to the basic injection quantity Q to consider the fuel temperature THF detected by the fuel temperature sensor 36 and the coolant temperature THW detected by the coolant temperature sensor 37.

The injection period determining device calculates a command injection period (command value of the injection quantity) in accordance with the common rail pressure NPC, the command injection quantity QFIN and a characteristic map (shown in FIG. 3), which is made in advance using experimental data. The command injection period corresponds to a current supply period supplied to the solenoid of each of the injectors 4.

The injector driving device applies a pulsed injector driving current (injection command pulse, TQ pulse or injector driving signal) to the solenoid valve of each of the injectors 4 through the injector driving circuit EDC.

FIG. 4A is a time chart showing the current supply period (command value of the injection quantity TQ) of the TQ pulse (injector driving signal) for a specific cylinder, for example the cylinder #1. FIG. 4B is a time chart showing the waveform of the injector driving current supplied to the solenoid valve of the injector 4 for the cylinder #1 corresponding to the current supply period of the TQ pulse. Additionally, FIG. 4C is a time chart showing a fuel injection rate for the cylinder #1.

In this embodiment, the ECU 10 calculates the basic injection quantity Q, the injection timing TFIN and the target fuel pressure PFIN using the signals from the engine speed detecting device and the acceleration stroke sensor 35, those of which perform as an operating condition detecting device for detecting the operating condition of the engine 1.

Alternatively, the ECU may correct at least one of the basic injection quantity Q, the command injection quantity QFIN, the injection timing TFIN and the target fuel pressure PFIN considering the common rail pressure NPC detected by the common rail pressure sensor 30 and the signals from other sensors such as the fuel temperature sensor 36, the coolant temperature sensor 37, a leakage fuel temperature sensor 38, an oil temperature sensor 39, an idling acceleration stroke sensor 40, an atmospheric pressure sensor 41, an atmospheric temperature sensor (ambient temperature sensor) 42, the intake air amount sensor 43, the boost pressure sensor 44, the intake temperature sensor 45, the EGR valve position sensor 46, the VGT position sensor 47, the exhaust $O_2$ sensor 4B, an exhaust temperature sensor 49, an exhaust pressure sensor 50, a throttle position sensor, an intake pressure sensor, an injection timing sensor and so on, those of which perform as the operating condition detecting device.

A current supply circuit for a starter is connected to the ECU 10. When the ignition key is inserted into a key cylinder and turned to a start position ST with the starter switch on, the current supply circuit supplies current to the starter. The ECU 10 is input a signal indicating a selected shift position of a transmission driven by engine, a signal indicating the depression of the clutch pedal, a signal indicating the current supply to the starter, a vehicle speed signal output from a vehicle speed sensor, signals to detect electrical loads including electromagnetic clutch for an air conditioning system, an electric fan for a condenser of the air conditioning system, a fan for blowing air into the passenger compartment for the air conditioning system, an electric fan for the radiator and head lamps, and signals to detect vehicle information such as mechanical loads including a compressor for the air conditioning system, an oil pump for a power steering system and so on.

In the common rail system, the ECU 10 is capable of performing a multiple-injection control, which injects fuel dividing into more than once in one cycle (intake stroke, compression stroke, expansion stroke and exhaust stroke) of the engine 1, especially, in a single combustion stroke for each of the cylinders. For example, the injector 4 is actuated more than once in the compression and expansion stroke to perform the multiple-injection control. The multiple-injection control performs the pilot injections more than once before a main injection, after injections more than once after a main injection, or the pilot injections more than once before a main injection and the after injections more than once after the main injection.

Accordingly, the ECU 10 calculates each injection quantity in multiple-injection control in accordance with the operating condition of the engine 1. More specifically, the ECU 10 comprises a pilot injection quantity determining device and a main injection quantity determining device.

The pilot injection quantity determining device calculates the pilot injection quantity QPILOT in accordance with the engine speed NE, the command injection quantity QFIN and a characteristic map (shown in FIG. 5), which is made in advance using experimental data. The main injection quantity determining device calculates the main injection quantity QMAIN subtracting the pilot injection quantity QPILOT from a total injection quantity TOTALQ.

The ECU 10 further comprises a first interval determining device and a second interval determining device. The first interval determining device calculates a first interval TINT between the pilot injection and the main injection in accordance with the engine speed NE, the command injection quantity QFIN and a characteristic map (shown in FIG. 6) in the multiple-injection control. The map is made in advance using experimental data. The second interval determining device calculates a second interval between the pilot injections in accordance with the engine speed NE, the pilot injection quantity QPILOT and a characteristic map (not shown) in the multiple-injection control. The map is made in advance using experimental data.

Furthermore, the ECU 10 comprises a pilot injection period determining device and a main injection period determining device. The pilot injection period determining device calculates a pilot injection period (command value of the injection quantity) TQPILOT in accordance with the pilot injection quantity QPILOT, common rail pressure NPC and a characteristic map (not shown), which is made in advance using experimental data. The main injection period determining device calculates a main injection period (command value of the injection quantity) TQMAIN in accordance with the main injection quantity QMAIN, common rail pressure NPC and a characteristic map (not shown), which is made in advance using experimental data.

The ECU 10 in this embodiment detects an engine speed variation with respect to each expansion stroke for each of the cylinders, and compares the detected value of the engine speed variation for each of the cylinders with an average value of the engine speed variation of all cylinders while the V-8 engine 1 is idling (stable idle condition) or the ECU 10 is performing a learning control for the pilot injection quantity (the precondition for the pilot leaning control is met and the performing condition for the pilot learning control is met). After that, the ECU 10 performs a control for an injection quantity correction between the cylinders (FCCB correction) to adjust an optimum injection quantity for each of the cylinders of the V-8 engine to average the engine speed variation between the cylinders.

More specifically, the ECU 10 calculates an instantaneous engine speed with respect to each combustion stroke for each of the cylinders of the engine by means of calculating an interval of the NE signal pulses from the crank angle sensor 34. After that, the ECU 10 reads the maximum value in the intervals of the NE signal pulses between BTDC (before top dead center) 90° CA and ATDC (after top dead center) 90° CA as the lowest engine speed N1 in instantaneous engine speeds of the cylinder. Similarly, the ECU 10 reads the minimum value in the intervals of the NE signal pulses between BTDC 90° CA and ATDC 90° CA as the highest engine speed Nh in instantaneous engine speeds of the cylinder. Instead of the lowest engine speed N1 and the highest engine speed Nh, a low engine speed and a high engine speed, those of which are representative of the engine speed variation of the cylinder, may be used.

After performing those calculations with respect to each of the cylinders, the ECU 10 calculates the difference ΔNk between the highest engine speed Nh and the lowest engine speed N1 with respect to each of the cylinders. Accordingly, the ECU 10 calculates a value of the engine speed variation with respect to each of the cylinders of the V-8 engine. After calculating the average value for the engine speed of all of the cylinders, the ECU 10 calculates the difference of the engine speed variation between the cylinders on the basis of the value of the engine speed with respect to each of the cylinders and the average value of the engine speed variation of all of the cylinders. Then, the ECU 10 adds the first injection quantity correction amount (FCCB correction amount) or the first injection period correction amount as the first correction amount to the injection quantity for each injection with respect to each of the cylinders so that the engine speed variation between the cylinders of the engine 1 is averaged.

Additionally, the ECU 10 performs an average engine speed correction (ISC correction) uniformly for all of the cylinders based on the difference ΔNE between the idling speed and the target engine speed so that the idling speed (average engine speed) as a current engine speed corresponds to the target engine speed while the engine 1 is idling or the ECU 10 is performing the learning control for the pilot injection quantity (the precondition for the pilot leaning control is met and the performing condition for the pilot learning control is met).

More specifically, the ECU 10 compares the average engine speed NE for each of the cylinders of the engine 1 with the target engine speed (target NE) to calculate a second injection quantity correction amount (ISC correction amount) or a second injection period correction amount as a second correction amount in accordance with the difference of the engine speeds. After that, the ECU 10 adds the second injection quantity correction amount (ISC correction amount) or the second injection period correction amount to the injection quantity with respect to each of the cylinders uniformly so that the average engine speed corresponds to the target engine speed. Preferably, the ECU 10 may perform the ISC correction comparing the engine speed NE corresponding to the Idling speed with the target engine speed, which is set on the basis of the operating condition such as the engine coolant temperature THW and the fuel temperature, and the vehicle condition such as the electric load and the mechanical load, and correcting the injection quantity in proportion to the difference between the engine speed and the target engine speed to achieve the target engine speed with a feedback control.

Figure 7:
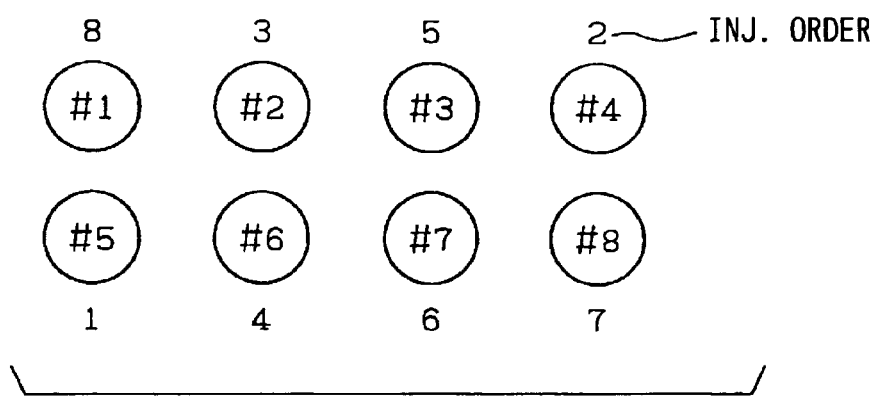
FIG. 7 is a diagram of assistance in explanation of the split pattern of the cylinder groups.

When the ECU 10 performs a small injection quantity learning control (pilot injection quantity learning control), the eight cylinders are divided into two groups of four cylinders. Namely, the cylinder group A includes the cylinders #2, #3, #5 and #8 and the cylinder group B includes the cylinders #1, #4, #6 and #7 as shown in FIG. 7. Then, the ECU 10 performs the control for the injection quantity correction between the cylinders (FCCB correction) and the average engine speed correction (ISC correction) with respect to each of the cylinder groups A and B with a fuel cut-off control with four cylinders off as shown in FIGS. 8C and 8D.

In this embodiment, the cylinders are divided into the cylinder group A and B so that the fuel is supplied to every other cylinder in the injection order (#5→#4→#2→#6→#3→#7→#8→#1). That is, the cylinder group A includes the cylinders #2, #3, #5 and #8, and the cylinder group B includes the cylinders #1, #4, #6 and #7. Alternatively, the cylinders may be divided into two groups, wherein the cylinder arrangement of the cylinder groups is symmetrical. Additionally, as the cylinder arrangement, cylinders of such as an in-line six-cylinder engine, an in-line eight-cylinder engine, V-6 engine, V-10 engine, V-12 engine and horizontally opposed engine may be divided into K groups such as two and three groups of three to five cylinders, and the ECU may perform the cylinder cut-off control with three to five cylinders with respect to each of the groups.

[Control Method in the Embodiment]

A method of the learning control for the pilot injection quantity in this embodiment will be briefly described with reference to FIGS. 1 to 17. FIG. 9 is a flowchart of the method of the learning control of the pilot injection quantity. The control routine shown in FIG. 9 is repeated at a predetermined time interval after the ignition switch is turned on.

When the control routine shown in FIG. 9 is initiated, the ECU 10 determines whether the precondition for the pilot learning control is met or not at step S1. When the result is negative (NO), the process goes to RETURN. Specifically, 1) at first, the ECU 10 determines whether the operating condition of the V-8 engine is idling or not on the basis of at least one of the sensor signals from various types of the sensors, which is attached to the engine 1 or the vehicle, capable of detecting the engine operating condition, switch signals from switches and the command value for control. As examples of those sensors and switches are the shift position sensor, the clutch sensor, the starter sensor, the common rail pressure sensor 30, the crank angle sensor 34, the acceleration stroke sensor 35, the idling acceleration stroke sensor 40, the EGR position sensor 46, the VGT position sensor 47, the exhaust temperature sensor 49, the throttle position sensor and so on.

2) Secondly, the ECU 10 determines whether the sensor signals from various types of the sensors, which is attached to the engine 1 or the vehicle, capable of obtaining environmental conditions are within predetermined ranges indicating that an idling non-load fuel consumption is in an expected range. As examples of those sensors are the fuel temperature sensor 36, the coolant temperature sensor 37, the leakage fuel temperature sensor 38, the oil temperature sensor 39, the idling acceleration stroke sensor 40, the atmospheric pressure sensor 41, the atmospheric temperature sensor (ambient temperature sensor) 42, the intake air amount sensor 43, the boost pressure sensor 44, the intake temperature sensor 45, the exhaust $O_2$ sensor 48, the exhaust temperature sensor 49, the exhaust pressure sensor 50, the throttle position sensor and so on.

3) Thirdly, the ECU 10 determines that the engine load is within a predetermined range in accordance with at least one of the sensor signals from various types of the sensors, which is attached to the engine 1 or the vehicle, capable of detecting the engine load condition, switch signals from switches and the command value for control. As examples of those sensors, switches and the command value are switches and sensors capable of detecting the electric loads such as the electric fan for the radiator, an electric heater, the head lamps and the electromagnetic brakes, switches and sensors capable of detecting loads of the air conditioning system, the compressor for such as the power steering system and the pumps, and changes of the second injection quantity correction amount to be required to maintain the idle speed variation or the engine speed at the predetermined idle speed variation or the predetermined idling speed.

(4) Lastly, the ECU 10 determines that the command injection quantity, the command value of the injection quantity, the first injection quantity correction amount (FCCB correction amount), the second injection quantity correction amount (ISC correction amount), the fuel injection pressure (common rail pressure) and so on indicating that the engine speed is stable are within the predetermined ranges.

It is determined that the pilot learning precondition is met when the conditions (1) to (4) described above are satisfied and inhibiting conditions separately defined are not satisfied.

More specifically, when a learning temperature condition is met (for example, the temperature of the engine coolant is within the range of between 60° C. and 90° C.), an idling stable condition is met (for example, the shift position of the transmission is at neutral N or parking P), a vehicle speed condition is met (for example, vehicle speed SPD is equal to or less than 0 km/h), the acceleration stroke indicates that the acceleration pedal is not depressed (for example, the acceleration stroke ACCP is equal to or less than 0%), the idling speed is in a stable condition (for example, the engine speed NE is equal to or less than 1000 rpm), the engine speed condition is met (for example, the engine speed NE is equal to or less than 1000 rpm), the fuel injection pressure condition is met (for example, common rail pressure Pc is equal to or less than 100 MPa), the command injection quantity condition is met (for example, the command injection quantity QFIN is equal to or less than 5 $mm^3$/st corresponding to the non-load fuel consumption), the atmospheric pressure condition is met (for example, atmospheric pressures at high altitudes do not satisfy this condition), the intake air quantity learning condition is not met, the ISC correction amount stable condition is met (when the second injection quantity correction amount (ISC correction amount) is in a hunting condition, this condition is not satisfied), the engine stable condition is met (when the engine load variation is not occurred, the air conditioner switch is off, a relay switch of the electric fan for the radiator is off, and the electric loads such as the electric heater, the head lamp, the electromagnetic brake and soon are off, the condition is satisfied), and all of the conditions described above are met for a predetermined period continuously, it is determined that the pilot learning precondition is met. To the contrary, when the conditions described above is not met, it is determined that the pilot learning precondition is not met.

On the other hand, when the result in step S1 is positive (YES), namely when the pilot learning precondition is met, the ECU 10 determines whether the pilot learning performing condition is met or not (step S2). When the result is negative, the process goes to RETURN.

Specifically, the ECU 10 determines or calculates, for example, a running time of the engine, the number of turning off the ignition switch (IG OFF) and/or a mileage of vehicle, or values adding weight to those values in accordance with the load (the fuel injection pressure, the engine speed, the command injection quantity, the number of the multiple-injection and so on). After that, when the value exceeds a predetermined value, it is determined that the pilot learning performing condition is met.

Alternatively, it may be determined that the pilot learning performing condition is met when the first injection quantity correction amount (FCCB correction amount) at the time when the step S1 is positive, the second injection quantity correction amount (ISC correction amount) at the time when the step S1 is positive, the variation of the engine speed and/or the variation of the engine speed with respect to each of the cylinders exceeds a predetermined value. Furthermore, it may be forcibly determined by an external signal that the pilot learning performing condition is met.

Alternatively, it may be forcibly determined that the pilot learning performing condition is met in a case where a deterioration amount of the injector 4 due to a secular change is equal to or more than a predetermined value, a predetermined time period has passed since a flag for starter current supply is turned off, a predetermined time period has passed since the engine is started, the pilot learning is being required, are-learning due to an incorrect learning or an excessive learning is performed, or the common rail system is in a normal operating condition at the time when the pilot learning precondition is met. On the contrary, it may be determined that the pilot learning performing condition is not met when the conditions described above are not met.

On the other hand, when the result in step S2 is positive (YES), namely when the pilot learning performing condition is met, the ECU 10 performs a pilot injection quantity learning control. The pilot injection quantity learning control corrects the injection variation, an individual difference of the injector 4 and the deterioration amount of the injector 4 due to a secular change to the command value of the injection quantity (pilot injection period TQPILOT) for each of the pilot injections per one injection in the multiple-injection control in accordance with the learned vale (pilot injection quantity correction amount) for each of the cylinders in the first learning control (FCCB control) and the second learning control (ISC correction), those of which is described below. The pilot injection period TQPILOT is set in accordance with the pilot injection quantity QPILOT and the common rail pressure NPC.

When the process advances into the pilot injection quantity learning control, at first, the ECU 10 determines whether a learning control for the cylinder group A is completed or not. Specifically, the ECU 10 determines whether a learning completed flag for the cylinder group A is turned on or not (Step S3). When the result is positive, the ECU 10 performs the cylinder cut-off control with four cylinders of the cylinder group A (cylinders #2, #3, #5 and #8) as shown in FIG. 7. Namely, the ECU 10 actuates only the solenoid valves of the four injectors 4 corresponding to the cylinder group A at every predetermined injection timing (Step S4) and performs the pilot injection quantity learning control described below.

After that, the ECU10 fixes combustion conditions (injection condition, intake condition and exhaust condition) of the cylinder group A of the V-8 engine (Step S5). The fixing of the injection condition and intake and exhaust conditions of the cylinder group A is performed in such a manner described below.

At first, as shown in FIG. 10, the ECU 10 sets the number of multiple-injection at N (N="5" in this embodiment) in the multiple-injection control. Additionally, the ECU 10 sets the target value for the common rail pressure with respect to each pressure level different from each other. That is, as shown in FIG. 10, the ECU 10 sets the target fuel pressure PFIN at A [MPa]. In this embodiment, the target fuel pressure is sequentially set at from B [MPa] to E [MPa].

The target fuel pressure PFIN, namely the common rail pressure with respect to each pressure level, in which the pilot injection quantity learning control is performed, may be set at an arbitrary pressure. Furthermore, the common rail pressure may be set not only at five pressure levels, but also at arbitrary pressure levels such as three, seven and ten pressure levels.

Additionally, after the ECU 10 finishes calculating the injection quantity correction amounts (learned values) for the same pressure level, the ECU 10 change the common rail pressure to the next pressure level (for example, A→B, B→C, C→D and D→E), and then the process advances to step S6.

At this point, the ECU 10 adjusts the pump driving signal (driving current value) to the solenoid of the supply pump 3 in accordance with the pressure difference between the common rail pressure NPC detected by the common rail pressure sensor 30 and the target fuel pressure PFIN to achieve the target fuel pressure PFIN as a target value of the common rail pressure. For example, the ECU 10 performs a feedback control so that the common rail pressure NPC corresponds to the target fuel pressure PFIN by means of controlling the discharge fuel amount from the supply pump 3, in which the discharge fuel amount is controlled by changing the opening of the solenoid of the supply pump adjusting the ON to OFF ratio (current supply period or DUTY ratio) of the pump driving signal per unit of time according to the pressure difference between the common rail pressure NPC and the target fuel pressure PFIN. Accordingly, the common rail pressure is changed from the pressure level A corresponding to a low injection pressure in a normal idling condition to the pressure level E corresponding to a high injection pressure different from a pressure in the normal idling condition.

Additionally, the ECU 10 sets a reference position of the injection timing TFIN for N (N="5" in this embodiment) times injections at a position in the vicinity of the TDC. Furthermore, the ECU sets the target engine speed for the ISC correction at 750 rpm, stops the EGR control, and fixes a target boost pressure, a valve opening of the throttle valve 19 and a valve opening of the SCV.

Moreover, the ECU 10 fixes an interval for each command value in the multiple-injection control when the ECU 10 performs the pilot injection quantity learning control. For example, as shown in FIG. 10, the ECU 10 sets the interval QP1–2 of the command value at TPLLCR (for example, 10° CA), the interval QP2–3 of the command value at TPL2CR (for example, 11° CA), the interval QP3–4 of the command value at TPL3CR (for example, 12° CA), and the interval QP4–5 of the command value at TFUPCR (for example, 13° CA). In this embodiment, the QP4 is the main injection.

The fixing of the injection condition and the intake and exhaust conditions for the cylinder group B of the V-8 engine 1 is performed similar to the ones for the cylinder group A.

After that, the ECU 10 performs uniform N split injection control while the ECU 10 performs the fuel cut-off control with the four cylinders of cylinder group A of the V-8 engine 1. Namely, the ECU 10 performs the multiple-injection control (N split injection), which injects the pilot injection quantity QPILOT of fuel corresponding to a value with 1/N of the total injection quantity (value with 1/N of a non-load fuel consumption), divided the command injection quantity (QFIN) by the number of the multiple-injection N. For this purpose, the ECU 10 calculates each of the injection quantity command value (or each of the pilot injection quantity) per one injection in the multiple-injection control, in which the total injection quantity is equally divided by the number of the multiple-injection N.

As shown in the computing equation of formula 1 below, each of the injection quantity command value of this pilot injection corresponds to a value with 1/N of the total injection quantity totalQ, wherein the value is calculated by dividing the command injection quantity by the number of the multiple-injection N, for example a value with 1/N of the non-load fuel consumption Qidle used in which the operating condition of the cylinder group A of the V-8 engine is in the steady idling condition. The command injection quantity is calculated adding the injection quantity correction amount, which is considered the engine coolant temperature THW and the fuel temperature THF, to the basic injection quantity calculated from a characteristic map, which is made in advance using the experimental data of the relationship between the engine speed NE and the acceleration stroke ACCP, or a computing equation.

In this embodiment, the total injection quantity totalQ is 5 mm$^3$/ST when the operating condition of the cylinder group A of the engine 1 is in a steady idling condition. Therefore, The command value of the injection quantity for each of the pilot injections comes to be 1 mm$^3$/ST per one injection in the multiple-injection control when the ECU 10 sets the number of the multiple-injection at 5.

(pilot injection quantity)=(Qidle)/N+(previous learned value)×(correction amount)=(totalQ)/N+(previous learned value)×(correction amount)     (1)

Figure 11:
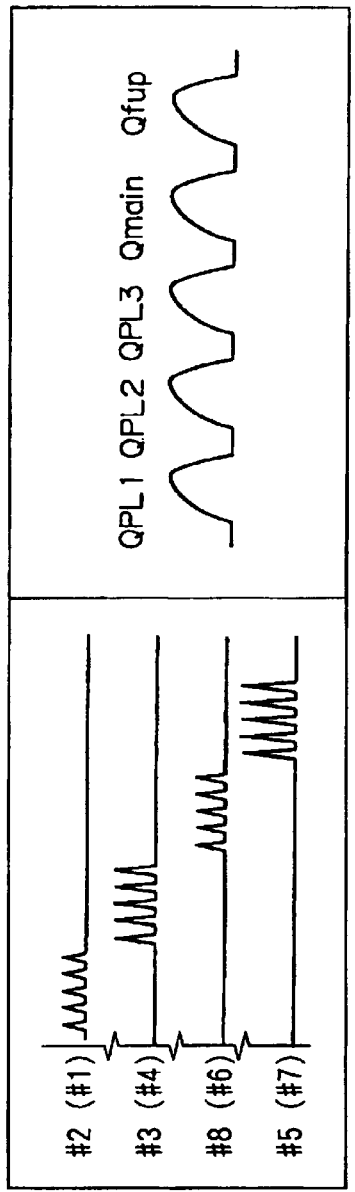
FIG. 11 is a diagram modeling the injection behaviors and the contents of the control.

The ECU 10 may calculate the pilot injection amount correcting each of the command values of the injection quantity (QPL1=QPL2=QPL3=QPL4 (Qmain)=QPL5 (Qfup)=total Q/N) for the pilot injection, based on the value Qidle/N with 1/N of the injection quantity command value at the non-load fuel consumption, shown in the formula 2 below, to be considered the effect of the interval between the command values in the multiple-injection control at the time when the pilot injection quantity learning control is performed, the effect of the pressure in the cylinders at the injection starting timing, and the effect of the fuel injection pressure (common rail pressure) so that the N split injection quantity comes to be equal to the pilot injection quantity as shown in FIG. 11.

(pilot injection quantity)=Qidle/N+QPLCPQ+QINT+(previous learned value)×(correction amount)     (2)

Wherein the Qidle is an applied value in accordance with a map, which is made in advance using experimental data of a relationship among the engine speed NE, the acceleration stroke ACCP and the basic injection quantity, or a computing equation. The QPLCPQ is a correction coefficient for the pressure in the cylinder, and the QINT is a correction coefficient for the interval dependence. The QPLCPQ and the QINT may be a injection period correction amount (current supply correction amount of TQ pulse) corresponding to the command value of each of the injection quantities (pilot injection period) TQPILOT for the pilot injection per one injection in the multiple-injection control instead of the fuel injection quantity correction amount corresponding to the small injection quantity (pilot injection amount) QPILOT per one injection in the multiple-injection control.

Figure 12:
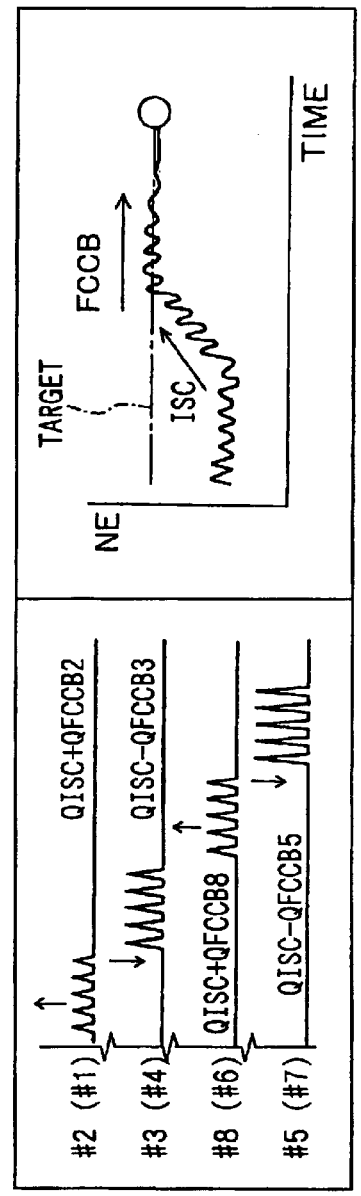
FIG. 12 is a diagram modeling the injection behaviors and the contents of the control.

After that, as shown in FIG. 8C, the ECU 10 performs the first learning control (FCCB correction control) for learning the first injection quantity correction amount (FCCB correction amount) QFCCB corresponding to the pilot injection quantity for each of the cylinders of the cylinder group A while the ECU 10 performs the cylinder cut-off control with the four cylinders of the cylinder group A, and the uniform N split injection control (Step 7). Specifically, as shown in FIG. 12, the ECU 10 adds the first injection quantity correction amount (FCCB correction amount) QFCCB to each of the command values of the injection quantity for the pilot injection per one injection in the multiple-injection control with the cylinder group A by means of performing the first learning control (FCCB correction control) for correcting the fuel injection quantity for each of the cylinders of the cylinder group A in accordance with the difference of the engine speed variations between the cylinders of the cylinder group A so that the engine speed variation between the cylinders of the cylinder group A is smoothed. At this process, the FCCB correction amount of each of the injections for each of the cylinders is reflected by adding the QFCCB/N to the pilot injection amount corresponding to the value with 1/N of the non-load fuel consumption described above.

After that, the ECU 10 performs the second learning control (ISC correction) for learning the second injection quantity correction amount (ISC correction amount) QISC for the pilot injection quantity of each of the cylinders of the cylinder group A while the ECU 10 performs the cylinder cut-off control with the four cylinders of the cylinder group A, and the uniform N split injection control (Step S8). As shown in FIG. 12, the ECU 10 performs the second learning control (ISC correction) to adjust the average engine speed of each of the cylinders of the cylinder group A to the target engine speed (target idling speed). In the second learning control, the ECU 10 adds the second injection quantity correction amount (ISC correction amount) QISC to the FCCB correction amount for each of the cylinders (QFCCB/N) of the cylinder group A evenly for all cylinders. In this process, the ECU 10 reflects the QISC/N to the value, which is calculated adding the pilot injection amount corresponding to the value with 1/N of the non-load fuel consumption Qidle and FCCB correction amount for each of the injections of each of the cylinders (QFCCB/N) of the cylinder group A, evenly for all cylinders. In the ISC correction, the ECU continues to uniformly add, for example, 1 mm$^3$/st to the fuel injection quantity of all of the cylinders at time intervals in the range of 50 ms to 70 ms for a predetermined time or until the ISC correction amount QISC is stabilized, i.e., until the average engine speed substantially corresponds to the target engine speed.

Figure 13:
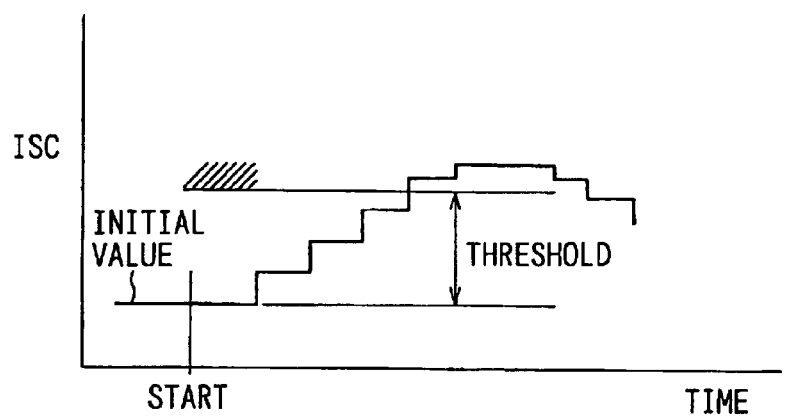
FIG. 13 is a time chart representing the change of the ISC correction amount to the engine load variation.

After that, the ECU 10 determines whether or not the engine load variation does not exceed a threshold value of the load variation in the process of the pilot injection learning control. Specifically, as shown in FIG. 13, the ECU 10 determines whether or not sensor signals from various types of sensors, which are capable of detecting the engine load variation such as the variation of an air conditioner system and the power steering system and so on, switch signals from switches, and an accumulated ISC correction amount accumulated all ISC correction amount QISC from the ISC correction amount at the first time of the second learning control to the ISC correction amount at this time of the second learning control, does not exceed the threshold value of the load variation (Step S9). When the result is negative, that is, when the engine load variation has exceeded the threshold value of the load variation, the process goes to the RETURN to stop the pilot injection quantity learning control to prevent the incorrect learning and the excessive learning. In this process, the ECU 10 may re-learn the FCCB correction amount QFCCB and the ISC correction amount QISC described above.

Figure 14:
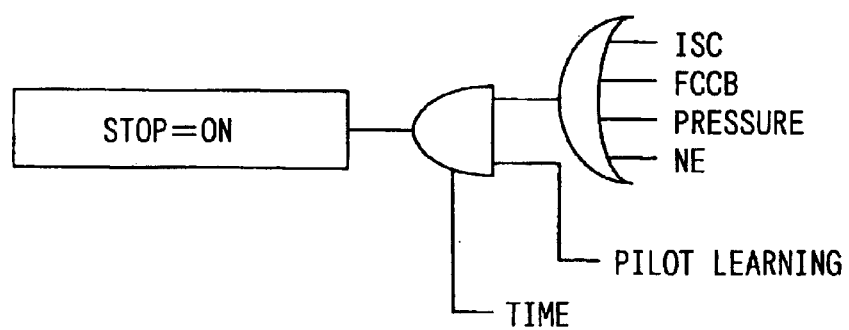
FIG. 14 is a block diagram showing the learning control stop condition.

On the other hand, the result in step S9 is positive, that is, when the engine load variation does not exceed the threshold value of the load variation, the ECU determines whether the V-8 engine 1 is running steadily with the cylinders of the cylinder group A or not. Specifically, as shown in FIG. 14, the ECU 10 determines whether the pilot injection quantity learning control is to perform or not, and whether the variation of the present FCCB correction amount QFCCB to the previous FCCB correction amount QFCCB, the variation of the present ISC correction amount QISC to the previous ISC correction amount QISC, the variation of the fuel injection pressure and the variation of the engine speed NE are within predetermined ranges or not, respectively (Step S10). When the result is negative, that is, when the ECU-10-determines that the engine is not running steadily, the ECU 10 stops the pilot injection amount learning control and ends the control routine in FIG. 9.

Figure 15:
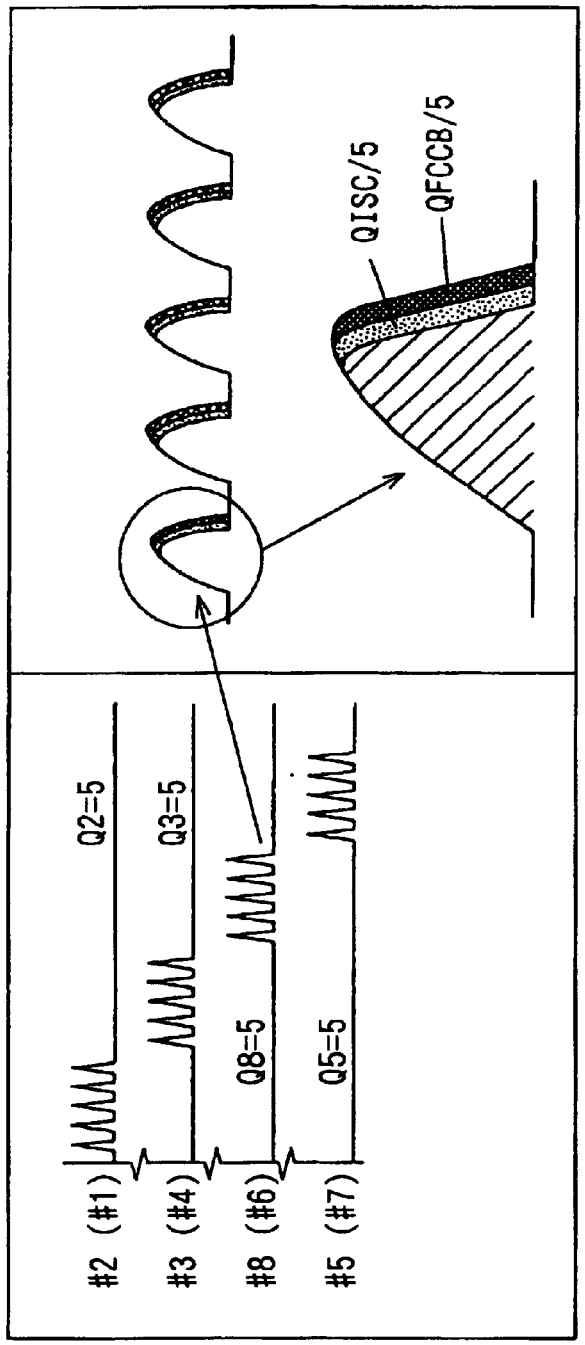
FIG. 15 is a diagram modeling the injection behaviors and the contents of the control.

On the other hand, when the result in step S10 is positive, that is, when the engine is running steadily with the cylinders of the cylinder group A, as shown in FIG. 15, the ECU 10 calculates the present learned value for each of the cylinders of the cylinder group A under the common rail pressure of the present pressure level based on the ISC correction amount and the FCCB correction amount (Step S11). Specifically, the present learned value for each of the cylinders of the cylinder group A is calculated based on a value QFCCB/N divided the FCCB correction amount for each injection in step S7 by the number of the multiple-injection N and a value QISC/N divided the ISC correction amount for each injection in step S8 by the number of the multiple-injection N. The computing equation is shown below, and the calculation is made for each of the cylinders of the cylinder group A with respect to each of the pressure levels of the common rail pressure.

(present learned value)=QISC/N+QFCCB/N+(previous learned value)=(QISC+QFCCB)/N+(previous learned value)={(ISC correction amount)+(FCCB correction amount)}/N+(previous learned value)   (3)

The present learned value for each of the cylinders of the cylinder group A is calculated as the injection quantity correction amount (correction value) to the small injection quantity (pilot injection amount) per one injection in the multiple-injection control under the present pressure level of the common rail pressure for adding to the command value of the injection amount (totalQ/N), which is the value with 1/N of the non-load fuel consumption of the pilot injection. The present learned value for each of the cylinders of the cylinder group A may be the injection period correction amount (=current supply period correction amount of TQ pulse) to each of the command values of the injection quantity for the pilot injection TQPILOT (=pilot injection period) per one injection in the multiple-injection control instead of the injection quantity correction amount to the small injection quantity QPILOT (=pilot injection quantity) per one injection in the multiple-injection control.

Figures 16, 17:
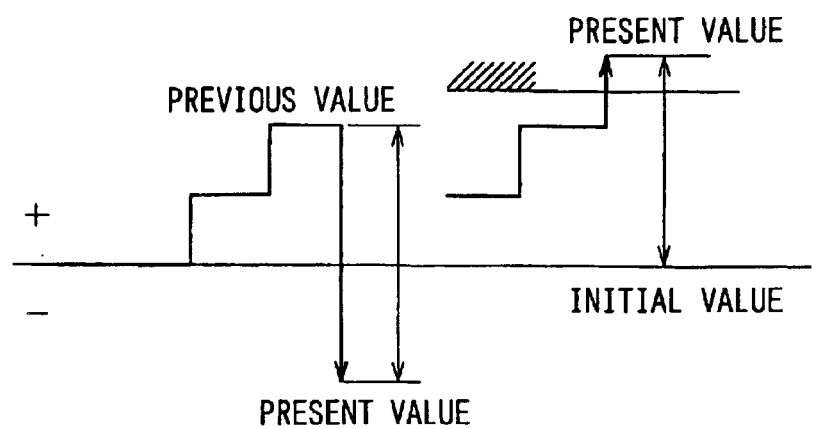
FIG. 16 is a diagram of assistance in explanation of the learned value guard.
FIG. 17 is a map storing the learned value.

Then, the ECU 10 checks the level of the present learned value calculated in step S11 (learned value guard) and controls the level of the present learned value. specifically, as shown in FIG. 16, the ECU 10 determines whether the variation of the present learned value to the previous learned value (difference between the previous learned value and the present learned value) is within a normal range of the learned value (allowable range for a change of the learned value per one pilot injection quantity learning control) or not. Additionally, the ECU 10 determined whether an accumulated learned amount (total learned amount) accumulated all learned value from the learned value at the first time (at the start of learning control) to the present learned value at this time, exceeds the threshold value of the excessive learning or the incorrect learning or not (Step S12). When the result is negative, that is, when the ECU 10 determines that the present learned value is an abnormal value, the ECU 10 invalidates the present learned value and ends the control routine in FIG. 9. In this process, the ECU 10 may re-learn the FCCB correction amount QFCCB and the ISC correction amount QISC described above.

On the other hand, when the result in step S12 is positive, the ECU 10 determines whether the calculation of the learned value under all of the predetermined pressure levels of the common rail pressure has been finished or not. For example, the ECU 10 determines whether the calculation of the learned value under the pressure level E [MPa] has been finished or not (Step 13). When the result is negative, that is, when the ECU determines that the calculation of the learned value under all of the predetermined pressure levels of the common rail pressure has not been finished, the process advances to step 5 through steps 1 to 4. In step 5, the ECU does not change the condition of the injection for the cylinder group A, and the intake and exhaust conditions. After that, the ECU changes the common rail pressure from the previous pressure level to the next pressure level (for example, A→B, B→C, C→D and D→E), and then, performs the pilot injection amount learning control again to calculate the learned value for each of the cylinders of the cylinder group A under the next pressure level of the common rail pressure in accordance with the ISC correction amount and the FCCB correction amount.

When the result in step S13 is positive, that is, when the ECU confirms that the calculation of the learned value under all of the predetermined pressure levels of the common rail pressure has been finished, the ECU 10 writes the learned value calculated in step S11, namely, the learned value for each of the cylinders of the cylinder group A with respect to each of the pressure levels of the common rail pressure into a map with a form shown in FIG. 17, and stores the learned values into the memory such as a standby RAM, an EEPROM and so on (Step S14). After that, the ECU 10 turns on a learning completion flag of the cylinder group A (Step 15). Then, the process advances to step S3 through step S1 and step S2.

When the result in step S3 is positive, the ECU 10 determines whether the learning control for the cylinder group B has been finished or not. Specifically, the ECU checks whether a learning completion flag for the cylinder group B is turned on or not (Step S16). When the result is negative, the ECU 10 performs the cylinder cut-off control with four cylinders of the cylinder group B (cylinder #1, #4, #6 and #7) as shown in FIG. 7. Namely, the ECU 10 actuates only the solenoid valves of the four injectors 4 corresponding to the cylinder group B at every predetermined injection timing and performs the pilot injection quantity learning control below (Step S17).

After that, in a manner similar to step S5 described above, the ECU 10 fixes the combustion condition (the injection condition, the intake condition and the exhaust condition) for the cylinder group B (Step S18). Then, in a manner similar to step S6 described above, the ECU 10 performs the uniform N split injection control while performing the cylinder cut-off control with four cylinders of the cylinder group B (Step S19). Then, in a manner similar to step S7 described above, the ECU 10 performs the first learning control (FCCB correction) for learning the first injection quantity correction amount QFCCB (FCCB correction amount) corresponding to the pilot injection quantity for each of the cylinders of the cylinder group B while performing the cylinder cut-off control and the uniform N split injection control (Step S20). Then, in a manner similar to step S8 described above, as shown in FIG. 8D, the ECU 10 performs the second learning control (ISC correction) for learning the second injection quantity correction amount QISC (ISC correction amount) corresponding to the pilot injection quantity for each of the cylinders of the cylinder group B while performing the cylinder cut-off control and the uniform N split injection control (Step S21).

After that, in a manner similar to step S9 described above, the ECU 10 determines whether or not the variation of the engine load does not exceed the threshold value of the load variation in the process of the pilot injection quantity learning control described above (Step S22). When the result is negative, the ECU 10 stops the pilot injection quantity learning control.

On the other hand, when the result in step S22 is positive, in a manner similar to step S10 described above, the ECU 10 determines whether or not the engine is running steadily with the combustion cylinders of the cylinder group B (Step S23). When the result is negative, the ECU 10 stops the pilot injection quantity learning control.

On the other hand, when the result in step S23 is positive, in a manner similar to step S11 described above, the ECU 10 calculates the present learned value for each of the cylinders of the cylinder group B under the present pressure level of the common rail pressure in accordance with the ISC correction amount and the FCCB correction amount (Step 24). After that, in a manner similar to step S12 described above, the ECU 10 checks the level of the present learned value (learned value guard), which is calculated in step 24, for each of the cylinders of the cylinder group B (Step S25). When the result is negative, that is, when the level is out of the range, the ECU 10 invalidates the present learned value.

On the other hand, when the result in step 25 is positive, the ECU 10 determines whether the calculation of the learned values under all of the predetermined pressure levels of the common rail pressure has been finished or not (Step 26). When the result is negative, the process advances to step S17 through steps S1 to S16.

On the other hand, when the result in step S26 is positive (YES), in a manner similar to step S14 described above, the ECU 10 writes the learned value calculated in step S24, namely, the learned value for each of the cylinders of the cylinder group B with respect to each of the pressure levels of the common rail pressure into the map with the form shown in FIG. 17, and stores the learned values into the memory such as a standby RAM, an EEPROM and so on (Step S27). After that, the ECU 10 turns on a learning completion flag of the cylinder group B (Step 28). Then, the ECU 10 finishes the pilot injection quantity learning control and ends the control routine in FIG. 9.

The learning completion flags of the cylinder group A and B may be automatically turned off when at least one of the number of the ignition switch is turned off, the mileage of the vehicle, the engine running time, the deterioration amount of the cylinders due to secular change, the error amount of the injection quantity between the cylinders, and the error amount of the injection quantity to each of the command values of the fuel quantity TQPILOT (pilot injection period) of the pilot injection per one injection in multiple-injection control, exceeds a predetermined value.

When the pilot injection quantity learning control described above is finished, the engine operation returns to the normal operation. The ECU 10 reflects the stored learned value for each of the cylinders of the cylinder groups A and B under each of the pressure levels of the common rail pressure as the injection quantity correction amount at which the pilot injection quantity is calculated based on the computing equation 4 shown below. In the process, regarding the injection quantity correction amount of the small injection quantity QPILOT (pilot injection quantity) per one injection in the multiple-injection control other than the injection quantity correction amount under the pressure levels used in the pilot injection quantity learning control, that is, all of the predetermined pressure levels of the common rail pressure, the ECU 10 calculates the amount by interpolation or the like.

$$\text{(pilot injection quantity)}=(QPLB+QISC \times KISC) \times QUKTF+QFCCB \times KFCCB+\text{(learned value)} \times QKPC \times QKNE+QPLCPQ+QINT \quad (4)$$

Wherein, the QPLB is an applied value (value calculated from a characteristic map, which is made using experimental data of the relationship between the engine speed NE, the basic injection quantity Q and the acceleration stroke ACCP), the QISC is the ISC correction amount, the KISC is an ISC correction reflecting coefficient, the QKTHF is a fuel temperature correction coefficient, the QFCCB is the FCCB correction amount, the KFCCB is the FCCB correction amount reflecting coefficient, the QKPC is a learned value correction coefficient for pressure sensitivity, the QKNE is a learned value correction coefficient for engine speed sensitivity, the QPLCPQ is a correction coefficient for the pressure in the cylinder and the QINT is a correction coefficient for the interval dependence. The learned value is the present learned value, which is calculated corresponding to the learned value map with the form shown in FIG. 17 stored in the memory, for each of the cylinders with regard to each of the pressure levels. The QPLCPQ and the QINT may be an injection period correction amount (=the current supply period correction amount of the TQ pulse) to each of the command values of the injection quantity for the pilot injection per one injection in multiple-injection control instead of the injection quantity correction amount to the small injection quantity (=pilot injection quantity) per one injection in the multiple-injection control.

[Advantages of the Embodiment]

As described above, in the common rail system in this embodiment, when the ECU 10 performs pilot injection quantity learning control (the pilot learning precondition is met and the pilot learning performing condition is met), the ECU 10 performs the first learning control (FCCB correction) for learning the first injection quantity correction amount (FCCB correction amount) for each of the cylinders, and the second learning control (ISC correction) for learning the second injection quantity correction amount, which is required to maintain the idling speed (average idling speed) at the target engine speed, for evenly all of the cylinders, while the ECU 10 performs the multiple-injection with the pilot injection QPILOT corresponding to the value with 1/N of the total injection quantity, which is calculated dividing the command injection quantity by the number of the multiple-injection N, with respect to each of the pressure levels.

Accordingly, it is possible to correct the injection quantity correction amount to the pilot injection quantity per one injection in multiple-injection control, or the injection period correction amount to each of the command values of the injection quantity of the pilot injection per one injection in multiple-injection control over the wide-range operation area, in which the engine is running normally, based on the first injection correction quantity for each of the cylinders calculated with respect to each of the pressure levels and the second injection quantity correction amount evenly for all of the cylinders.

Additionally, the ECU 10 performs the first learning control for learning the first injection quantity correction amount for each of the cylinders with respect to each of the pressure levels not limited to a fuel injection pressure in the stable idling condition, and the second learning control for learning the second injection quantity correction amount, which is required to maintain the idling speed at the target engine speed, evenly for all cylinders.

Accordingly, even in a case where 1) the injection pressure is high, in which it is difficult to assure the quality of the injector, and the injection quantity is small such as 1 $mm^3$/ST, 2) the injection pressure is low and the injection quantity is small, or 3) the injection pressure is middle and the injection quantity is small, it is possible, while performing the multiple-injection with a small injection quantity, to quantitatively grasp the injection quantity variation amount to each of the command values of the injection quantity of the pilot injection per one injection in the multiple-injection control, the injection quantity variation amount between the cylinders, the individual difference of the injector 4, or the deterioration amount for the injector 4 due to secular change with respect to each of the cylinders of the cylinder group A and the cylinder group B over the wide-range operation area, in which the engine is running normally.

Figure 8A:
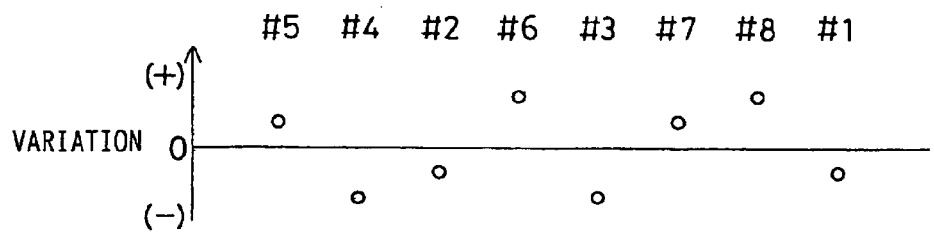
FIG. 8A is a diagram of assistance in explanation of the injection quantity variation between cylinders in the V-8 engine.
Figure 8B:
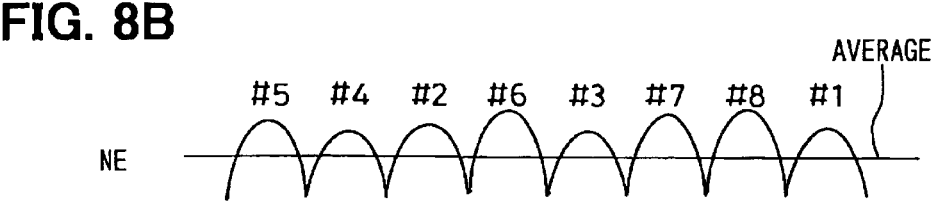
FIG. 8B is a diagram of assistance in explanation of the detected value of the engine speed variation for each of the cylinders and the average engine speed.
Figure 8C:
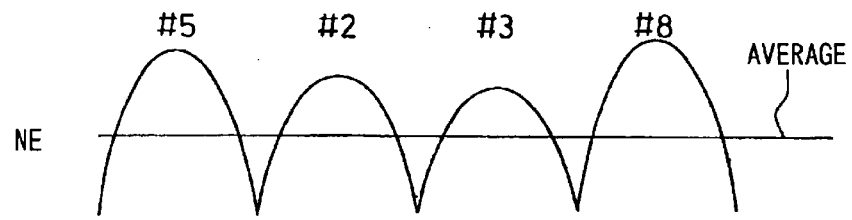
FIG. 8C is a diagram of assistance in explanation of the detected value of the engine speed variation for each of the cylinders and the average engine speed in the cylinder cut-off control with the cylinder group A.
Figure 8D:
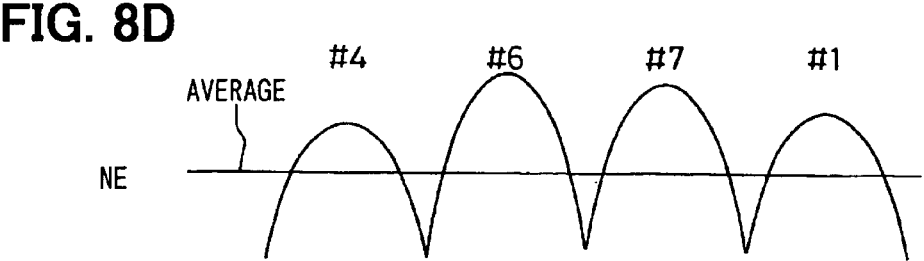
FIG. 8D is a diagram of assistance in explanation of the detected value of the engine speed variation for each of the cylinders and the average engine speed in the cylinder cut-off control with the cylinder group B.
Figure 9:
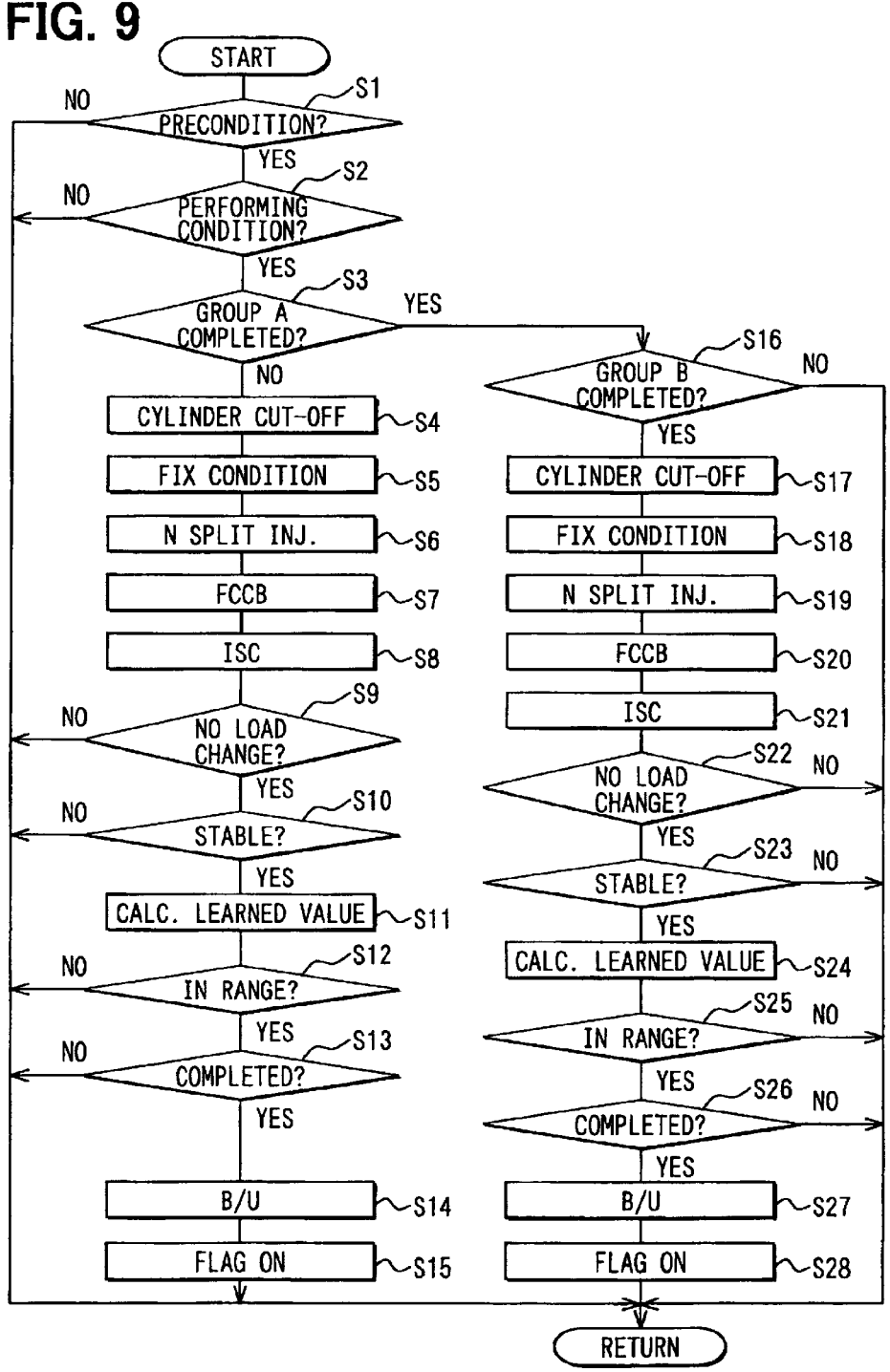
FIG. 9 is a flowchart of the pilot injection quantity learning control method.

Moreover, in a conventional learning control as shown in FIGS. 8A and 8B, when the ECU performs a pilot injection amount learning control, for example, in the V-8 engine, it is almost impossible to precisely and sensitively perform the learning control for the first injection quantity correction amount (FCCB correction amount) for each of the cylinders to smooth the engine speed variation between the cylinders due to the injection quantity variation between the cylinders, and a second injection quantity correction amount evenly for all cylinders to maintain the idling speed (average engine speed) at the target engine speed because the relationship between the injection quantity variation between the cylinders and the variation of the engine speed variation of each of the cylinders is low.

However, in the common rail system in this embodiment, when the ECU performs the pilot injection quantity learning control, for example in the V-8 engine, in a condition that the pilot learning precondition is met and the pilot learning performing condition is met, the cylinders are divided into two groups of four cylinders, that is, the cylinder group A and the cylinder group B, and the ECU performs the first learning control (FCCB correction) for learning the first injection quantity correction amount for each of the cylinders and the second learning control (ISC correction) for learning the second injection quantity correction amount (ISC correction amount) evenly for all cylinders to maintain the idling speed at the target engine speed while the ECU performs the cylinder cut-off control with the four cylinders of the cylinder group A or the cylinder group B.

Then, as shown in FIGS. 8C and 8D, performing the cylinder cut-off control with four cylinders, sensitivity of each injection quantity correction amount becomes high in the learning correction control of the first injection quantity correction amount (FCCB correction amount) to smooth the engine speed variation between cylinders to the injection quantity variation between cylinders, and in the learning correction control of the second injection quantity correction amount (ISC correction amount) to maintain the idling speed (average engine speed) at the target engine speed. Namely, it is capable of thinning not only fuel injections, but also detection (calculation) timing of the engine speed variation for each of the cylinders of the cylinder group A or the cylinder group B, the average of the engine speed variation among all cylinders of the cylinder group A or the cylinder group B, and the average engine speed for each of the cylinders of the cylinder group A or the cylinder group B. Accordingly, the relationship between the injection amount variation between cylinders and the engine speed variation between cylinders becomes high because the injection amount variation between cylinders and the engine speed variation between cylinders with respect to the cylinder group A and the cylinder group B largely appear. Therefore, it is capable of precisely performing the learning control for the small injection amount such as the pilot injection amount described above even in the multi-cylinder engine having more than five cylinders such as a six cylinder engine, an eight cylinder engine and so on.

[Modifications of the Embodiment]

In the embodiment described above, the present invention is applied to the common rail type fuel injection system with the pilot injection quantity learning control. Instead, the present invention may be applied to an injection quantity controller for an internal combustion engine provided with an electronically controlled distribution type fuel injection pump or an electronically controlled in-line fuel injection pump. In the above embodiment, the injectors are the electromagnetic fuel injection valves though, the injectors may be injectors with piezoelectric fuel injection valves. The number of the pilot injections performed prior to the main injection (pre-injections) may be set equal to or more than once, and the number of pilot injections performed after the main injection (after injections) may be set equal to or more than zero.

Although the above embodiment divides the total injection quantity equally and accurately into N split injection quantities for N times injections in step S6 and S19 of the control routine shown in FIG. 9, the total injection quantity is not necessarily divided accurately and equally into N split injection quantities. Alternatively, for example, when the total-Q is 5 $mm^3$/st, the N split injection may be performed divided the total-Q approximately equally into four split injection quantities of 1 $mm^3$/st, 1 $mm^3$/st, 1 $mm^3$/st and 2 $mm^3$/st, and the FCCB correction amount (first injection quantity correction amount) and the ISC correction amount (second injection quantity correction amount) may be reflected to each of the injections properly in accordance with the manner of the split (such as proportional division of 1:1:1:2, 1/4 each and so on), and then, the calculation of the present learned value for each of the cylinders of the cylinder group A and the cylinder group B in step Sll and step S24 of the control routine shown in injection FIG. 9 may be executed.

The advantages of the modifications are substantially the same as those of the above embodiment.

A nonvolatile memory, such as an EPROM or a flash memory, or another storage medium, such as a DVD-ROM, a CD-ROM or a flexible disk may be used for storing the present learned value or the previous learned value updated by the present or previous pilot injection quantity learning control instead of the standby RAM or the EEPROM used as a correction amount storing means for updating and storing the injection quantity correction amount or the injection period correction amount for each of the cylinders in the above embodiment. In such a case, the contents of the storage device are stored after the ignition switch is turned off or after the engine key is extracted from the ignition key.

Moreover, when the FCCB correction amount is equal to or more than a predetermined value, the ISC correction amount is equal to or more than a predetermined value, the total learned value in equal to or more than a predetermined value, or the difference between the previous learned value and the present learned value is out of the predetermined range in the above pilot injection quantity learning control, it is determined that the variation of the injection quantity is more than a predetermined value to the injection quantity command value. Therefore, it is capable of detecting a failure of the injector individually. In such a case, an indicator lamp may be lit to urge a driver to change the injector 4. Additionally, the ECU may enable to perform the above pilot injection quantity learning control at a constant or a variable learning correction frequency (for example, the mileage of the vehicle)

In the above embodiment, when the predetermined engine condition is met, all of the cylinders of the engine is uniformly divided into K groups. And then, while the ECU performs the cylinder cut-off control with the number of the cylinders with respect to each group, and the multiple injection control with a small injection quantity corresponding to the value with 1/N of the total injection amount, uniformly divided the command injection quantity by the number of the multiple injection with respect to each of the pressure levels, the ECU also performs the first learning control (FCCB correction) for learning the first injection quantity correction amount (FCCB correction amount) for each of the cylinders, and the second learning control (ISC correction) for learning the second injection correction amount, which is required to maintain the idling speed at the target engine speed, evenly for all of the cylinders. However, while the ECU performs the cylinder cut-off control with the number of the cylinders with respect to each of the groups and the injection control (single injection control) of the command injection quantity with respect to each pressure level, the ECU may perform the first learning control (FCCB correction operation) for learning the first injection quantity correction amount (FCCB correction amount) for each of the cylinders, and the second learning control (ISC correction) for learning the second injection correction amount evenly for all cylinders needed to maintain the idling speed at the target engine speed.

Additionally, while the ECU performs the cylinder cut-off control with the number of the cylinders with respect to each of the groups and the injection control (single injection control) of the command injection quantity with respect to each pressure level, the ECU may perform only the first learning control (FCCB correction operation) for learning the first injection quantity correction amount (FCCB correction amount) for each of the cylinders. Furthermore, while the ECU performs the cylinder cut-off control with the number of the cylinders with respect to each of the groups, the ECU may perform only the first learning control (FCCB correction operation) for learning the first injection quantity correction amount (FCCB correction amount) for each of the cylinders.

In the above embodiment, the engine is a V-8 though, this invent ion may be applied to an in-line six-cylinder engine, an in-line eight-cylinder engine, a V-6 engine, a V-10 engine, a V-12 engine and a horizontally opposed engine.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An injection quantity control apparatus for an internal combustion engine comprising:
   command value calculation means for calculating a command value of an injection quantity based on a command injection quantity, which is set in accordance with an operating condition of the engine and a fuel injection pressure injection;
   injection quantity control means for controlling a fuel injection quantity supplied into each cylinder of the engine, actuating an injector provided for each of the cylinders, based on the command value of the injection quantity;
   learning control performing means for performing a learning control to learn a correction amount for each of the cylinders to smooth an engine speed variation between the cylinders; and
   reflection means for reflecting the correction amount for each of the cylinders to the calculation of the command injection quantity or the command value of the injection quantity; wherein
   when a predetermined engine operating condition is met, the learning control performing means performs the learning control while a cylinder cut-off control is performed, in which all of the cylinders are uniformly or approximately uniformly divided into K groups and the cylinder cut-off control is performed with the cylinders of a group in the K groups.

2. The injection quantity control apparatus as in claim 1, wherein all of the cylinders are uniformly or approximately uniformly divided on the basis of the number of the cylinders of the engine, an order of injection or a cylinder arrangement.

3. The injection quantity control apparatus as in claim 1, further comprising:
   change means for changing an injection pressure of fuel supplied into each of the cylinders of the engine to a plurality of pressure levels; wherein
   the learning control performing means performs the learning control while performing a fuel injection control of the command injection amount with respect to each of the pressure levels.

4. The injection quantity control apparatus as in claim 1, wherein:
   the learning control performing means includes a first learning control performing means for performing a first learning control to learn a first correction amount for each of the cylinders to smooth the engine speed variation between the cylinders and a second learning control performing means for performing a second learning control to learn a second correction amount uniformly for all cylinders to maintain the engine speed at a target engine speed; and
   the reflection means reflects the first correction amount and the second correction amount to the calculation of the command injection quantity or the command value of the injection quantity.

5. An injection quantity control apparatus for an internal combustion engine comprising:
   command value calculation means for calculating a command value of an injection quantity based on a command injection quantity, which is set in accordance with an operating condition of the engine and a fuel injection pressure;
   injection quantity control means for controlling a fuel injection quantity supplied into each cylinder of the engine, actuating an injector provided for each of the cylinders based on the command value of the injection quantity;

learning control performing means for performing a first learning control to learn a first correction amount for each of the cylinders to smooth the engine speed variation between the cylinders of the engine and a second learning control to learn a second correction amount uniformly for all of the cylinders to maintain the engine speed at a target engine speed;

reflection means for reflecting the first correction amount and the second correction amount to the calculation of the command injection quantity or the command value of the injection quantity; and change means for changing an injection pressure of fuel supplied into each of the cylinders of the engine to a plurality of pressure levels; wherein when a predetermined engine operating condition is met, the learning control performing means performs the first learning control and the second learning control while a cylinder cut-off control is performed, in which all of the cylinders are uniformly or approximately uniformly divided into K groups, the cylinder cut-off control is performed with the cylinders of a group in the K groups, and a fuel injection control is performed with respect to each of the pressure level.

6. The injection quantity control apparatus as in claim 5, wherein all of the cylinders are uniformly or approximately uniformly divided on the basis of the number of the cylinders of the engine, an order of injection or a cylinder arrangement.

7. The injection quantity control apparatus as in claim 5, wherein when the first correction amount or the second correction amount is not stabilized after a predetermined period has elapsed, the engine speed variation between the cylinders is not smoothed after a predetermined period has elapsed, the engine speed does not approximately correspond to the target engine speed after a predetermined period has elapsed, or the first correction amount or the second correction amount is equal to or more than a predetermined value, the learning control performing means suspends or stops performing the first or the second learning control, or re-learns the first correction amount or the second correction amount.

8. The injection quantity control apparatus as in claim 5, wherein when an engine operating condition is in unstable condition, the learning control performing means suspends or stops performing the first or the second learning control, or re-learns the first correction amount or the second correction amount.

9. The injection quantity control apparatus as in claim 5, further comprising:

setting means for setting the number of multiple injection at N times in a multiple injection control performing a plurality of injections in one combustion stroke of the engine by means of actuating an injector more than once;

wherein the learning control performing means performs the first learning control and the second learning control while the multiple injection control with a small injection quantity corresponding to a value with 1/N of a total injection quantity calculated uniformly divided the control injection quantity by the number of the multiple injection with respect to each pressure level, is preformed.

10. The injection quantity control apparatus as in claim 9, wherein the first correction amount and the second correction amount is an injection quantity correction amount to the small injection quantity per one injection in the multiple injection control or an injection period correction amount to the command value of the injection quantity per one injection in the multiple-injection control for each of the cylinders with respect to each of the pressure levels.

11. The injection quantity control apparatus as in claim 9, further comprising storing means for updating and storing a value added a first value uniformly divided the first correction amount by the number of the multiple injection N, a second value uniformly divided the second correction amount by the number of the multiple injection N, and a previous learned value with respect to each of the pressure levels as a present learned value for each of the cylinders with respect to each of the pressure levels.

12. The injection quantity control apparatus as in claim 10, wherein when a variation of the previous learned value and the present learned value is equal to or more than a predetermined value or an accumulated learned value accumulated all learned values calculated by the first and second learning control so far is equal to or more than a predetermined value, the learning control performing means invalidates the present learned value.

13. The injection quantity control apparatus as in claim 9, wherein the multiple injection is an N split injection performing a pilot injection once or more than once prior to a main injection, an N split injection performing an after injection once or more than once after the main injection, or an N split injection performing a pilot injection once or more than once prior to a main injection and an after injection once or more than once after the main injection.

* * * * *